US012795626B2

United States Patent
(12) United States Patent
Kim et al.

(10) Patent No.: US 12,795,626 B2
(45) Date of Patent: Nov. 10, 2026

(54) METHOD AND DEVICE FOR SUPPORTING PLURALITY OF FREQUENCY BANDS IN WIRELESS COMMUNICATION SYSTEM

(71) Applicant: LG ELECTRONICS INC., Seoul (KR)

(72) Inventors: Sunam Kim, Seoul (KR); Jaehwan Kim, Seoul (KR); Sungho Park, Seoul (KR); Minseog Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 625 days.

(21) Appl. No.: 18/246,276

(22) PCT Filed: Sep. 25, 2020

(86) PCT No.: PCT/KR2020/013022
§ 371 (c)(1),
(2) Date: Mar. 22, 2023

(87) PCT Pub. No.: WO2022/065549
PCT Pub. Date: Mar. 31, 2022

(65) Prior Publication Data
US 2023/0354282 A1 Nov. 2, 2023

(51) Int. Cl.
*H04W 72/0453* (2023.01)
*H04L 5/00* (2006.01)
(Continued)

(52) U.S. Cl.
CPC ......... *H04W 72/0453* (2013.01); *H04L 5/005* (2013.01); *H04W 48/10* (2013.01); (Continued)

(58) Field of Classification Search
None
See application file for complete search history.

(56) References Cited

U.S. PATENT DOCUMENTS 7,962,144 B2 * 6/2011 Wong .................. H04W 84/025 455/450
9,509,469 B2 * 11/2016 Cheng .................. H04L 5/0048
(Continued)

FOREIGN PATENT DOCUMENTS

KR 10-2019-0073403 6/2019

OTHER PUBLICATIONS

PCT International Application No. PCT/KR2020/013022, International Search Report dated Jun. 16, 2021, 8 page.

*Primary Examiner* — Suk Jin Kang
(74) *Attorney, Agent, or Firm* — LEE, HONG, DEGERMAN, KANG & WAIMEY

(57) ABSTRACT

A method for a terminal to support a plurality of frequency bands in a wireless communication system according to an embodiment of the present specification comprises the steps of: receiving connection-related information related to a plurality of connections (CN) based on different frequency bands and a reference connection (RCN) related to the plurality of CNs; determining at least one specific CN among the plurality of CNs on the basis of the similarity of the Radio Frequency (RF) characteristics between the RCN and each of the CNs; and transmitting a request message related to the at least one specific CN.

10 Claims, 27 Drawing Sheets

(51) Int. Cl.
*H04W 48/10* (2009.01)
*H04W 72/02* (2009.01)
*H04W 74/0833* (2024.01)
*H04W 76/20* (2018.01)

(52) U.S. Cl.
CPC ....... *H04W 72/02* (2013.01); *H04W 74/0833* (2013.01); *H04W 76/20* (2018.02)

(56) References Cited

U.S. PATENT DOCUMENTS

2008/0212556 A1* 9/2008 Heo ........................ H04L 5/023 370/344
2012/0140714 A1* 6/2012 Koskela ................ H04W 56/00 370/329
2014/0029422 A1* 1/2014 Lee ....................... H04L 1/0025 370/230
2015/0043504 A1* 2/2015 Kato ..................... H04W 72/56 370/329
2015/0245402 A1* 8/2015 Mochizuki ............ H04W 36/22 370/328
2015/0382355 A1* 12/2015 Huang ................ H04W 72/542 370/329
2017/0078955 A1* 3/2017 Cheng ................... H04W 48/16
2017/0366987 A1* 12/2017 Amini ................... H04W 24/02
2018/0183466 A1* 6/2018 Emmanuel .............. H04L 69/16
2019/0052344 A1* 2/2019 Kundargi ............. H04B 7/0814
2019/0215215 A1* 7/2019 Maltsev ............ H04W 72/0453
2019/0222239 A1* 7/2019 Fox ...................... H04B 1/0096
2019/0239191 A1* 8/2019 Zee ....................... H04W 68/02
2020/0015315 A1* 1/2020 Fujishiro ........... H04W 72/0453
2020/0045615 A1* 2/2020 Karimli ................. H04W 48/08
2020/0178334 A1* 6/2020 Karimli ................. H04L 5/0007
2020/0288475 A1* 9/2020 Zhang ............... H04W 72/0453
2020/0314837 A1* 10/2020 Oh ........................ H04W 72/23
2021/0036706 A1* 2/2021 Weeks .................. H03L 7/0807
2021/0204344 A1* 7/2021 Babaei .................. H04W 80/02
2021/0247798 A1* 8/2021 Elgaard ................ H01Q 21/065
2023/0090192 A1* 3/2023 Oh ........................ H04W 72/23 370/329
2023/0345489 A1* 10/2023 Babaei .................... H04L 5/001
2024/0080141 A1* 3/2024 Zhou ..................... H04L 1/1607
2025/0030507 A1* 1/2025 Prasad ................. H04B 17/328
2025/0081196 A1* 3/2025 Babaei ................ H04L 27/2601
2025/0192927 A1* 6/2025 Zhou ..................... H04W 72/30

* cited by examiner

[FIG. 1]
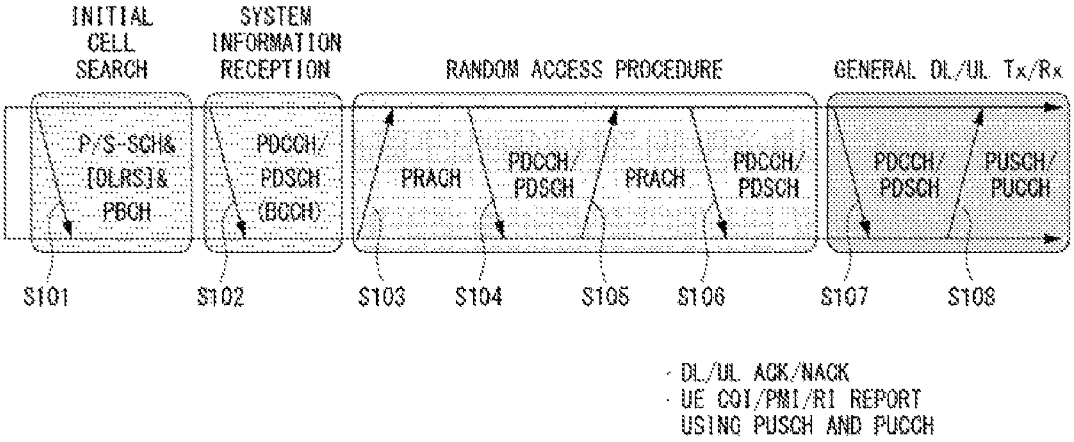

[FIG. 2]
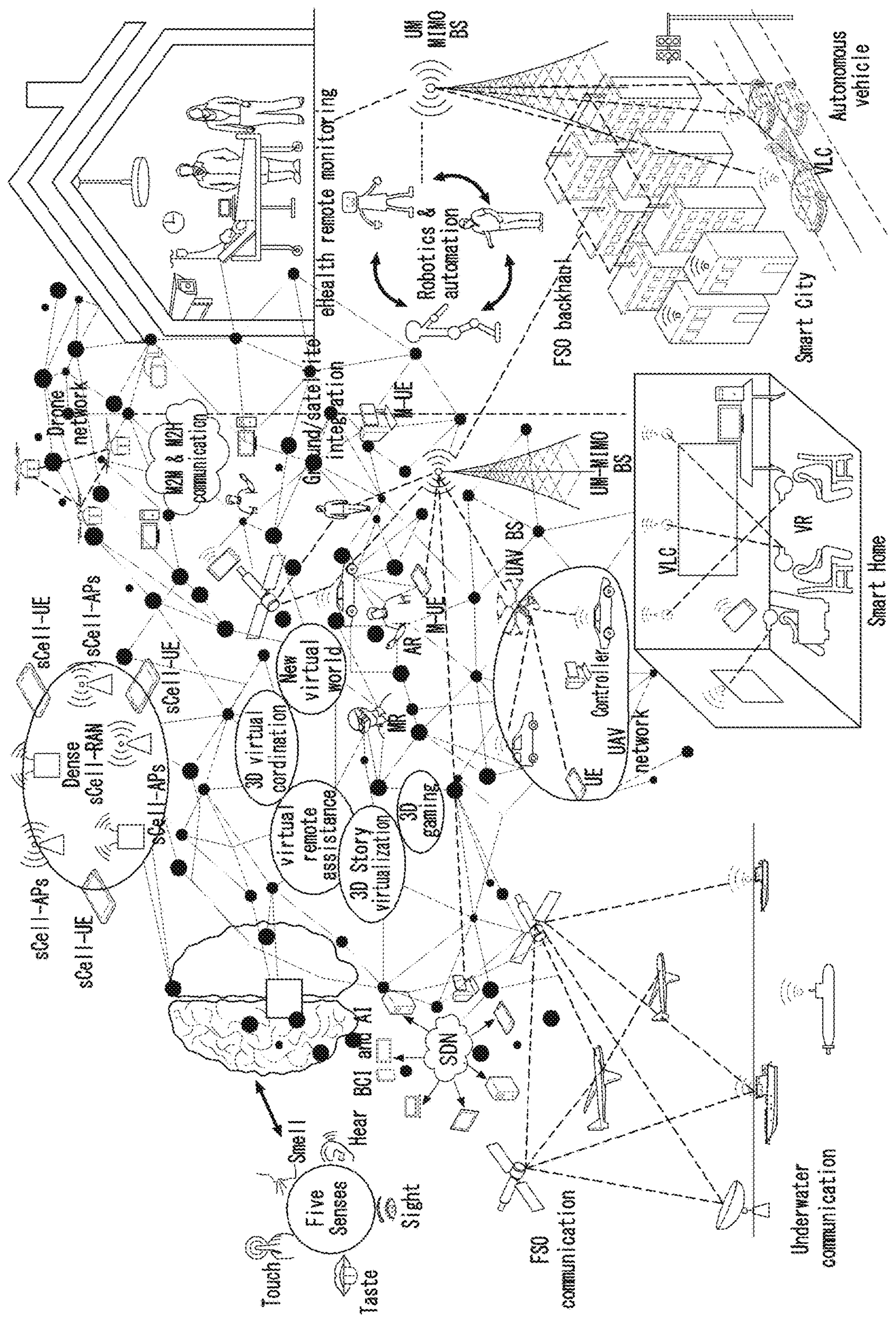

[FIG. 3]
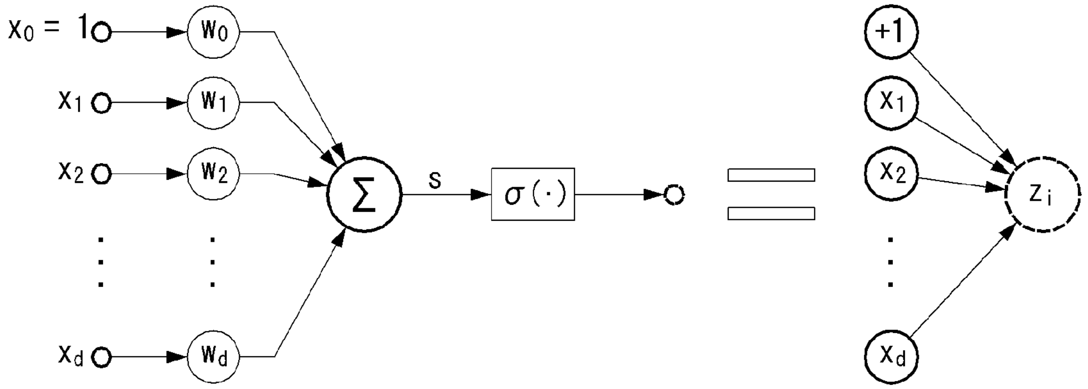

[FIG. 4]
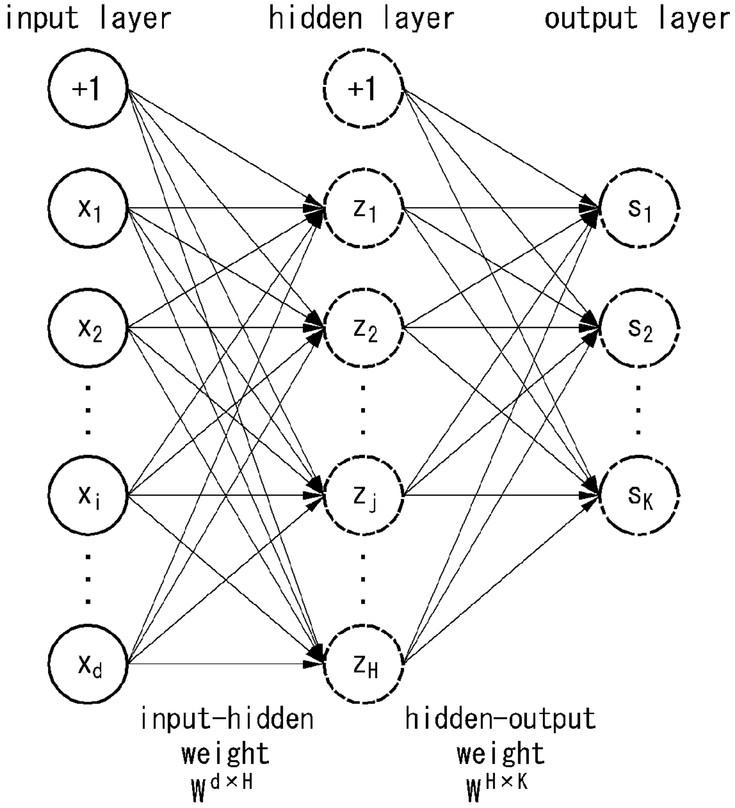

[FIG. 5]
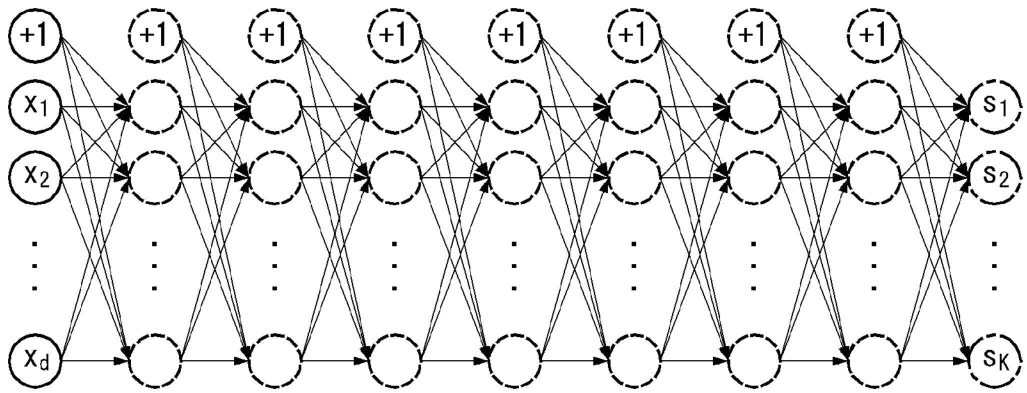

[FIG. 6]
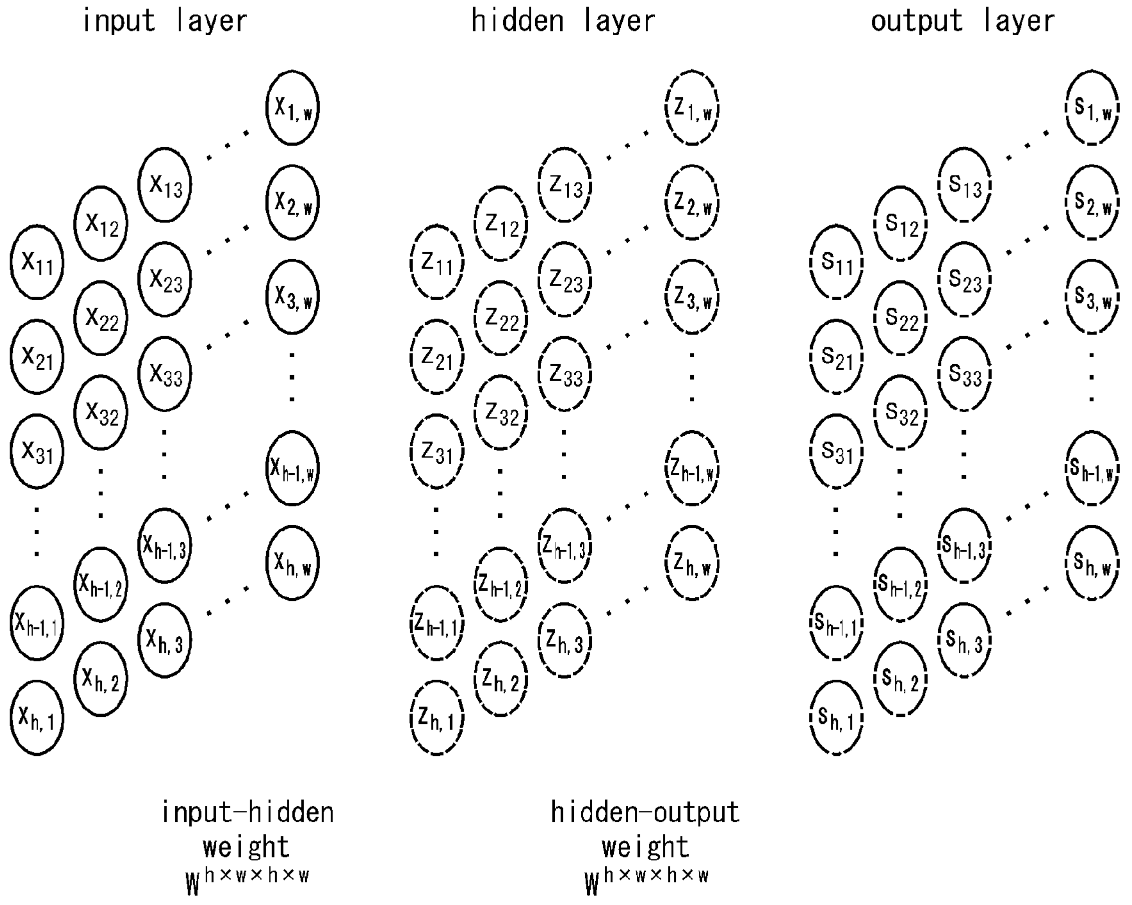

[FIG. 7]
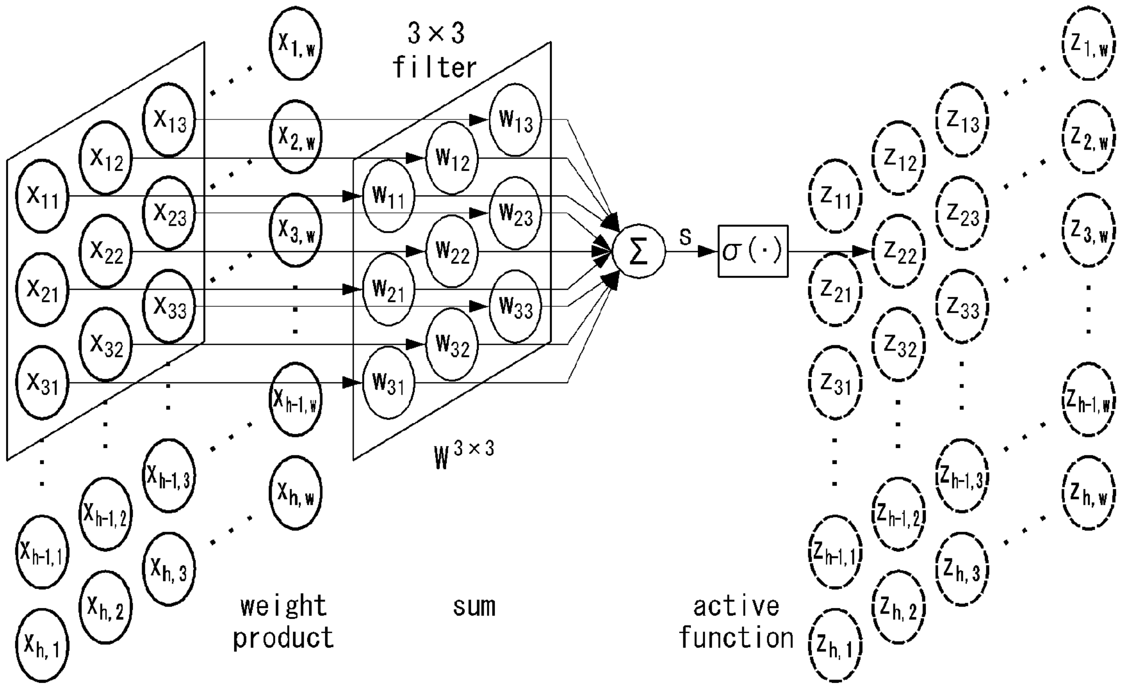

[FIG. 8]
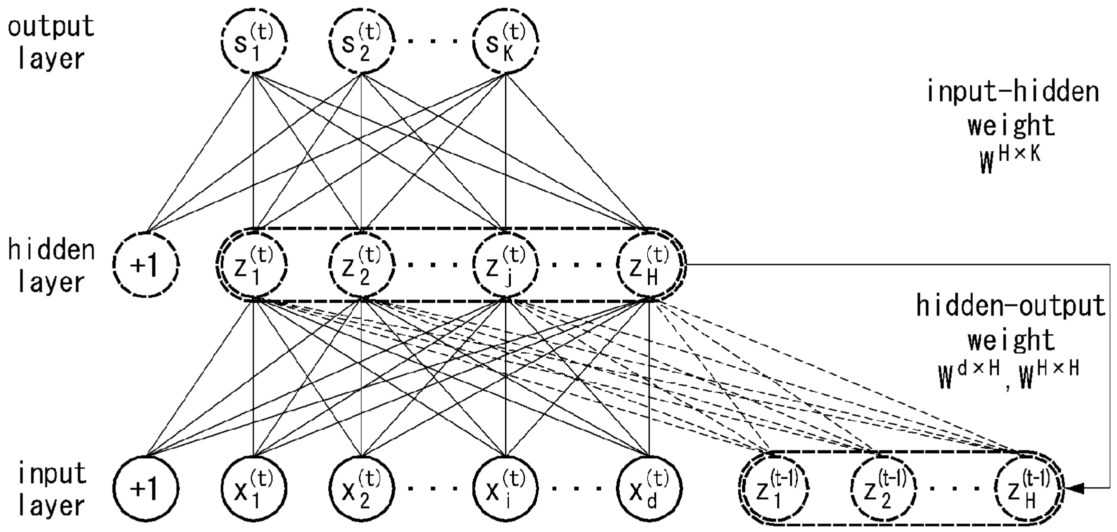

[FIG. 9]
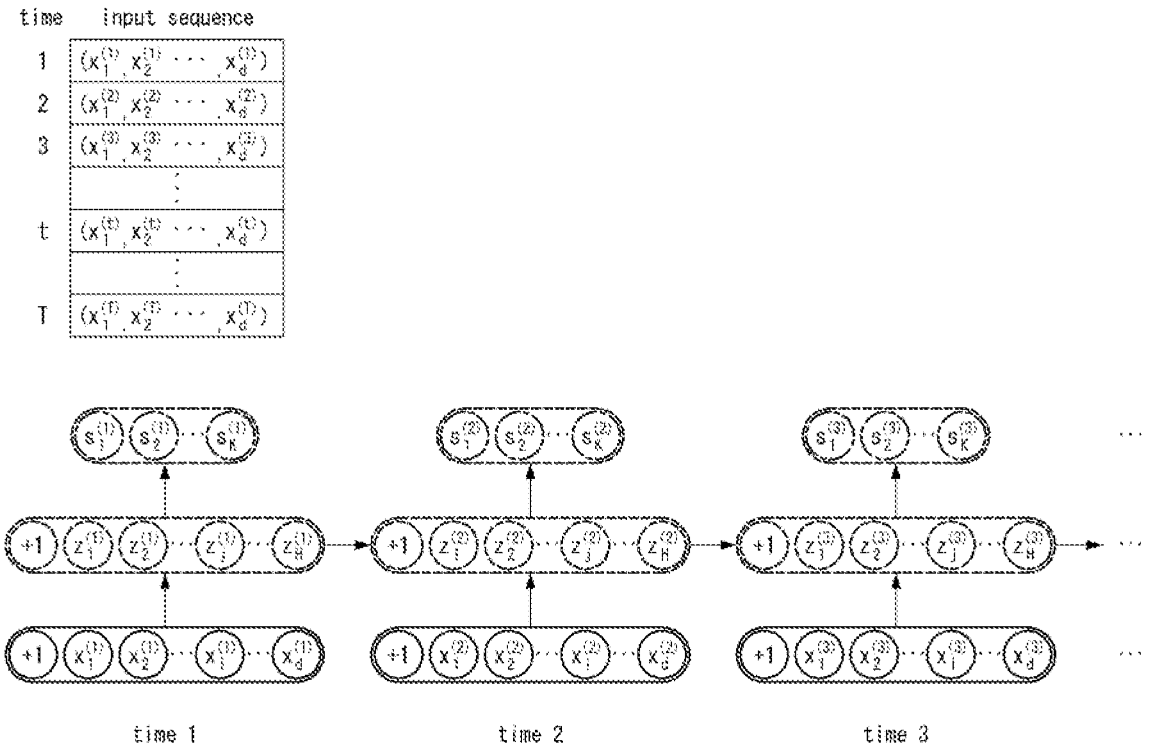

[FIG. 10]
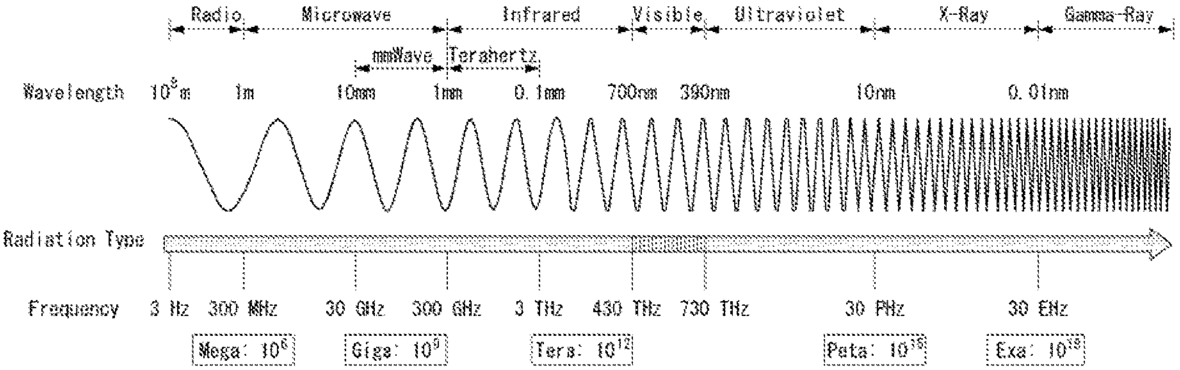

[FIG. 11]
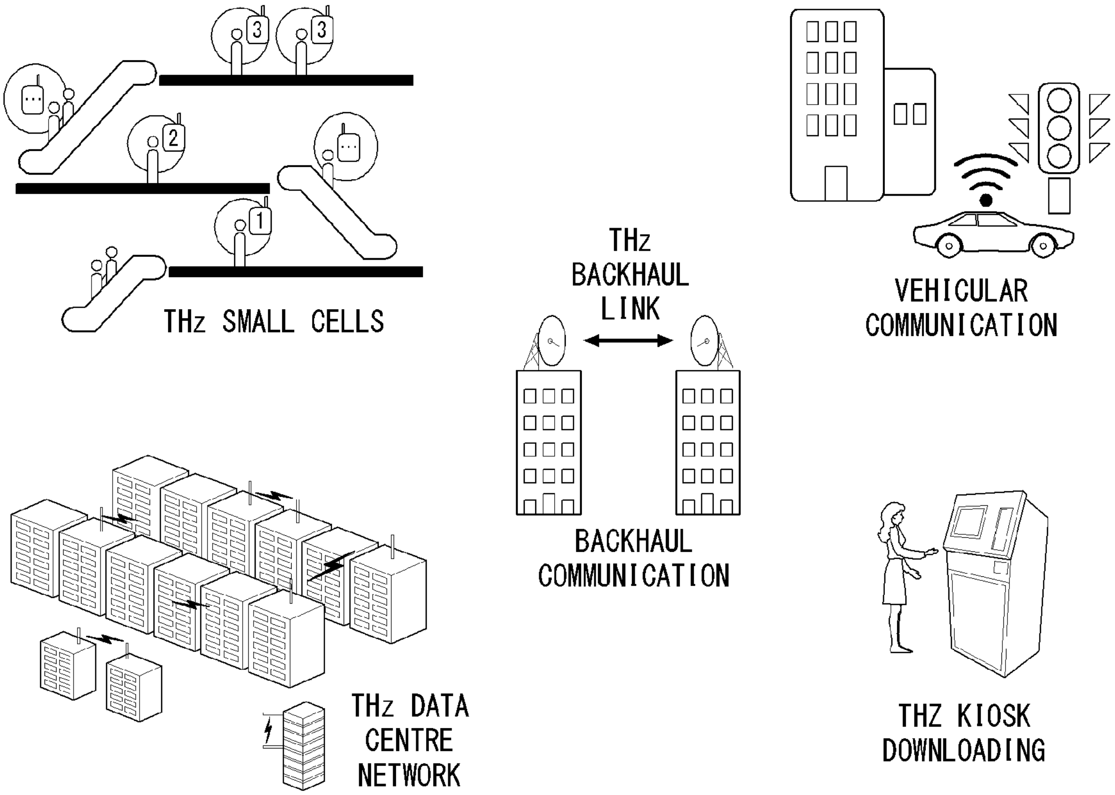

[FIG. 12]
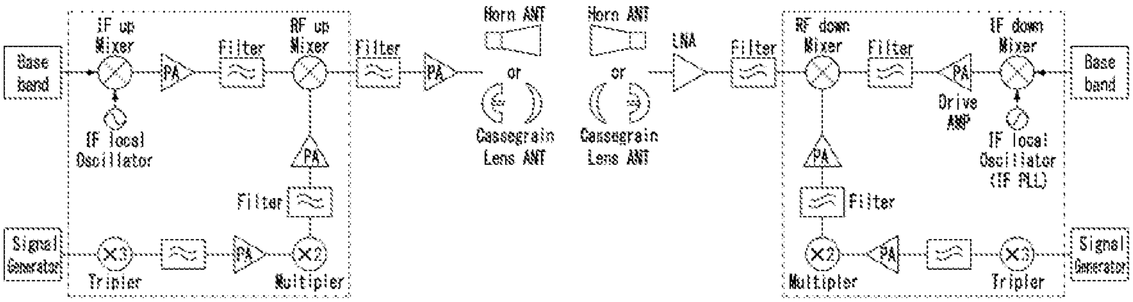
[FIG. 13]
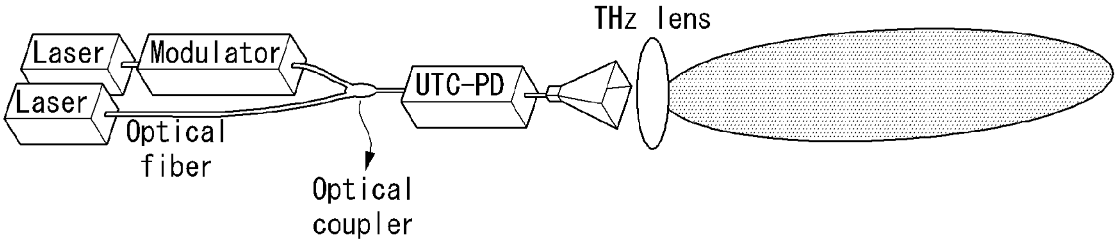

[FIG. 14]
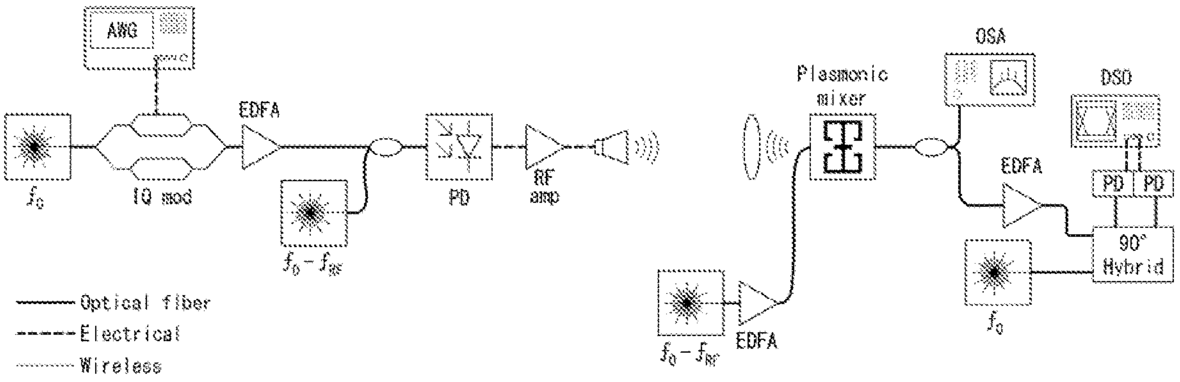

[FIG. 15]
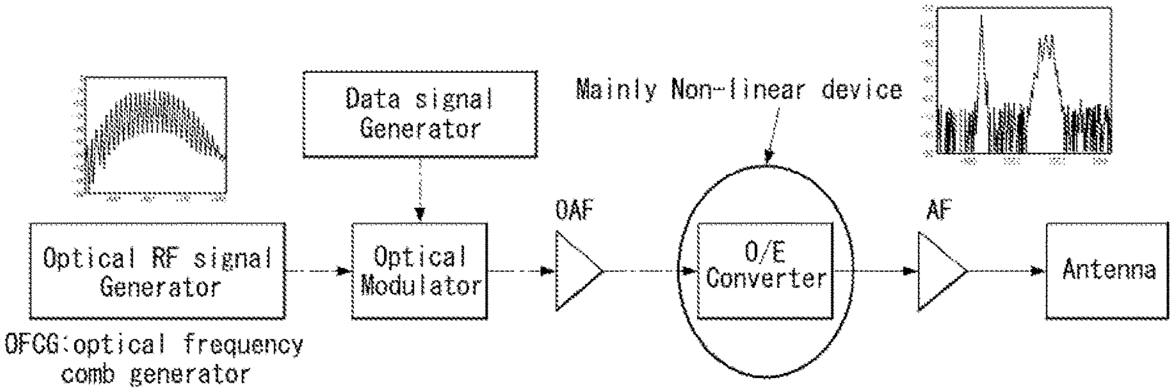

[FIG. 16]
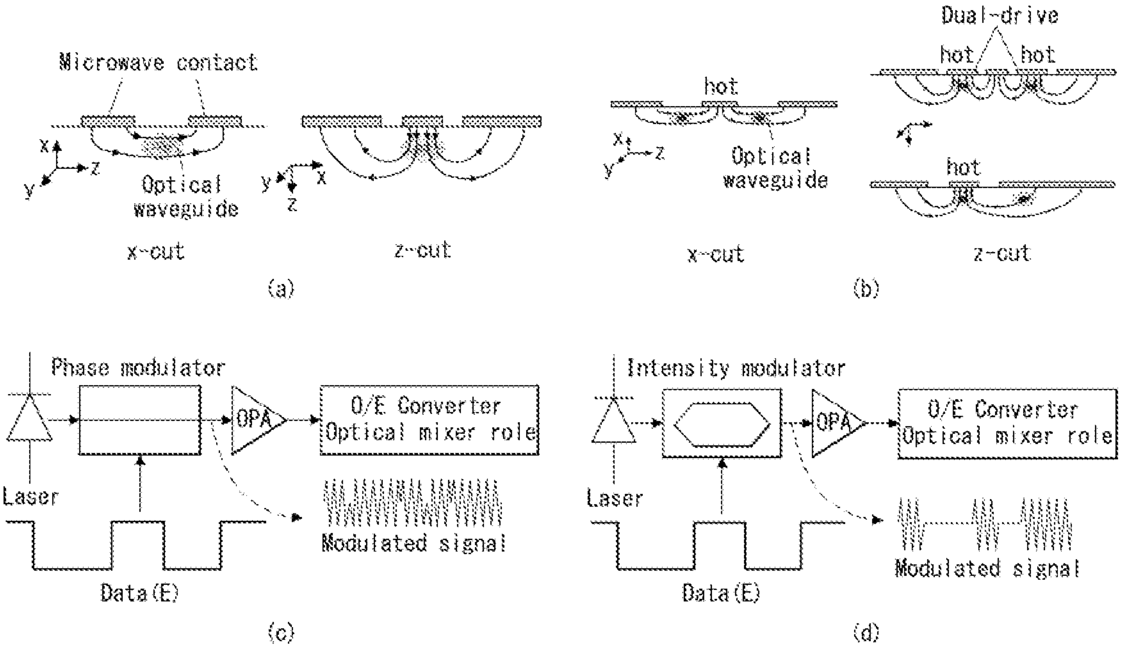

[FIG. 17]
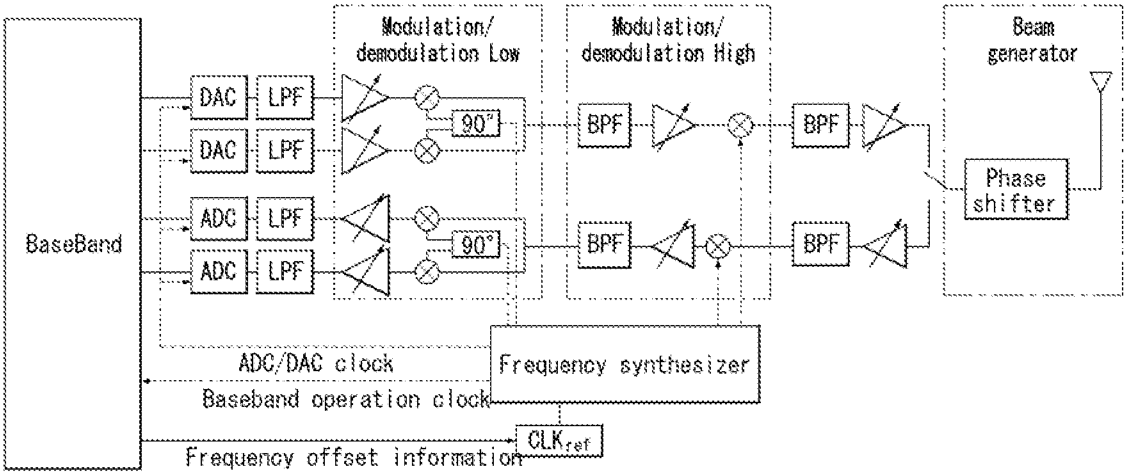

[FIG. 18]
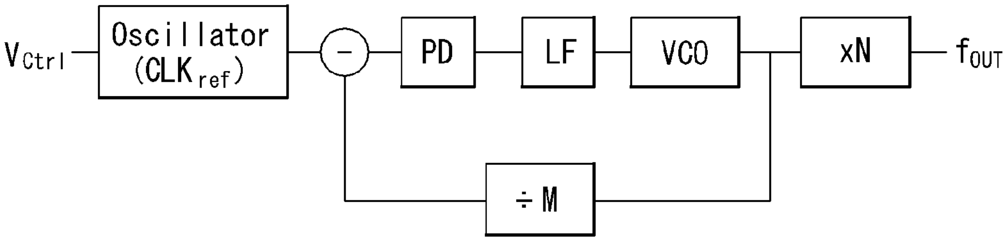

[FIG. 19]
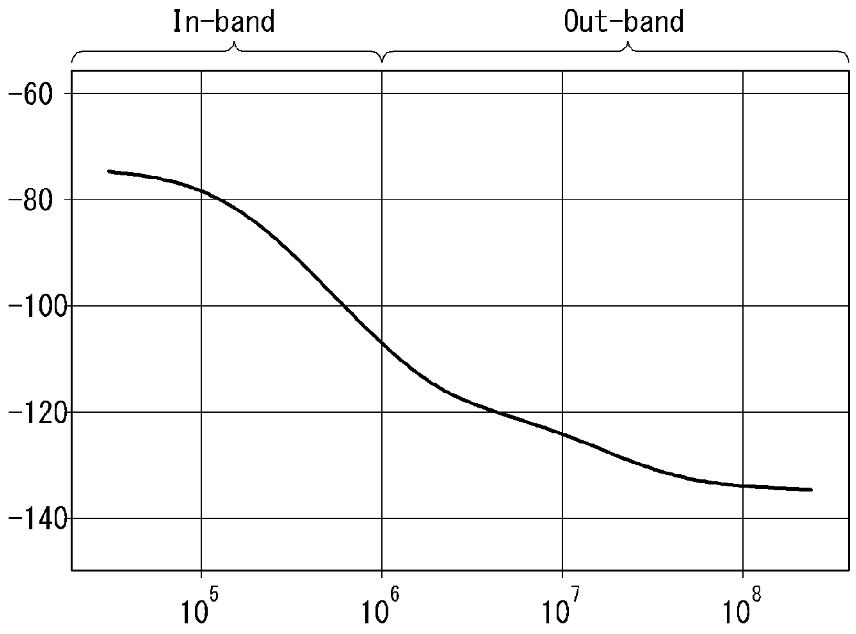

[FIG. 20]
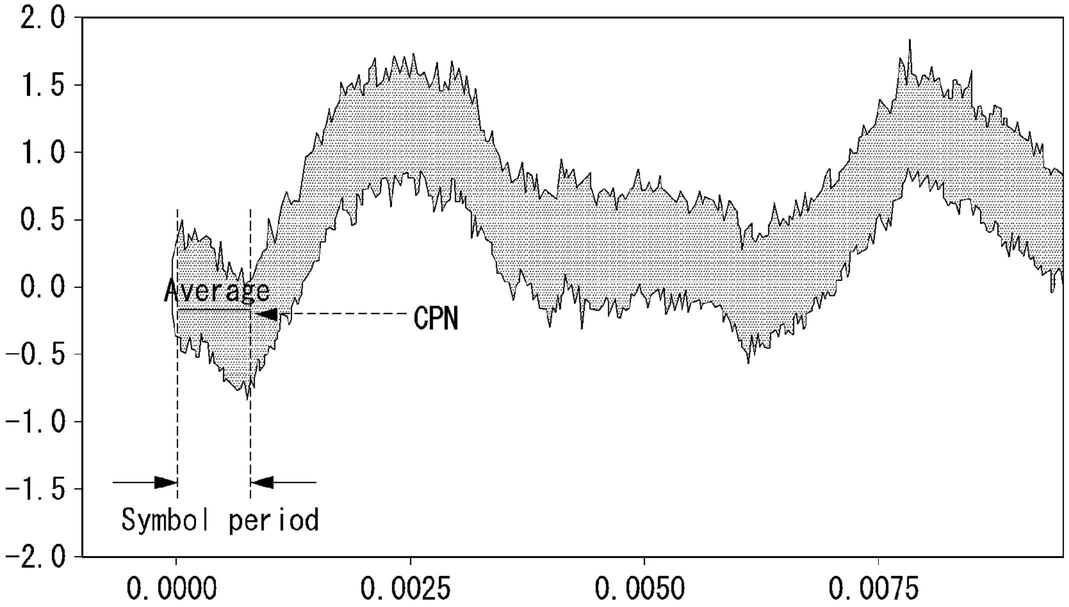

[FIG. 21]
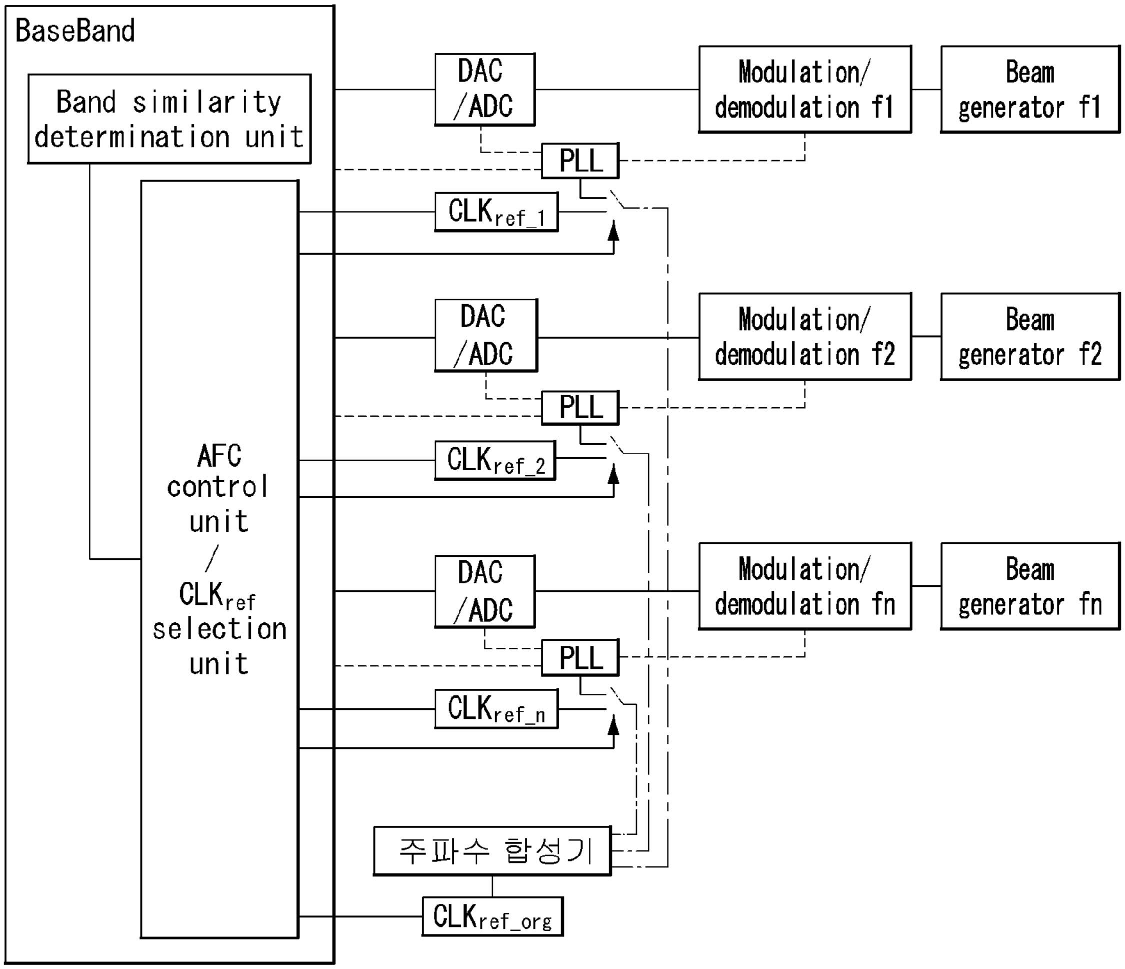

[FIG. 22]
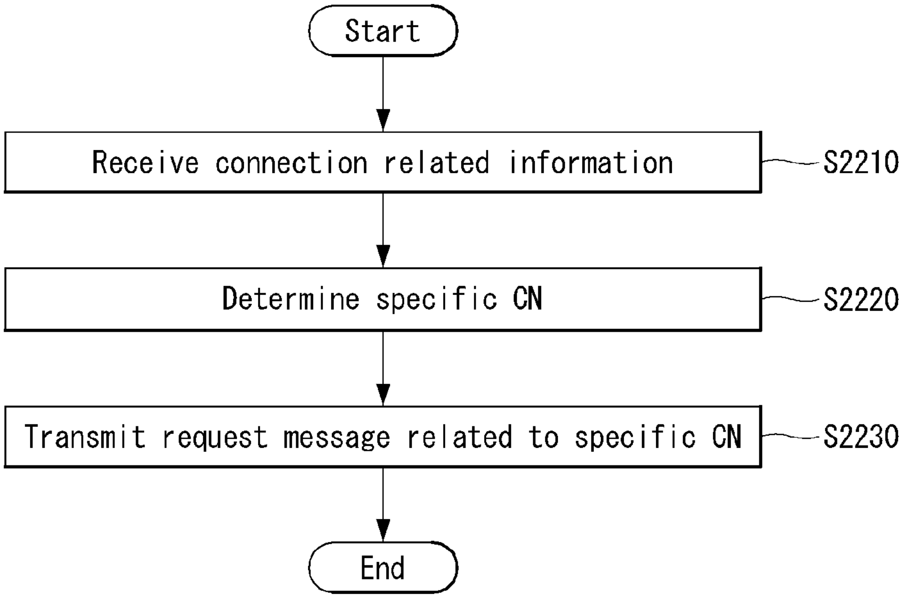

[FIG. 23]
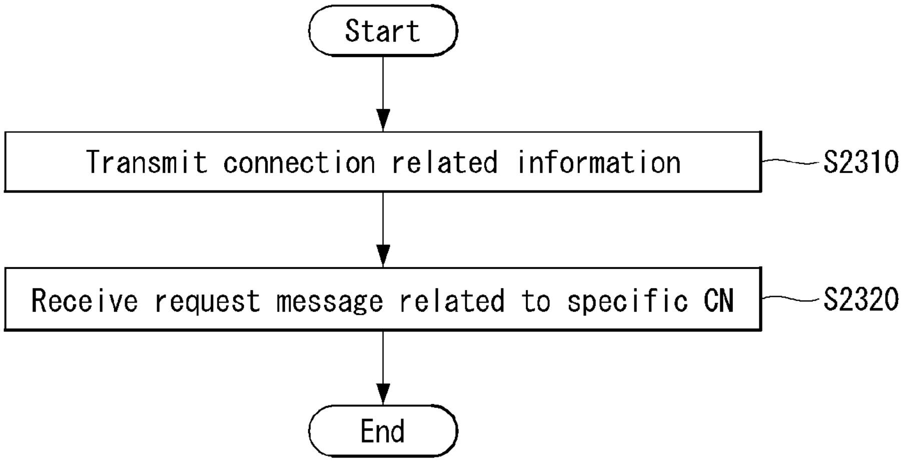

[FIG. 24]
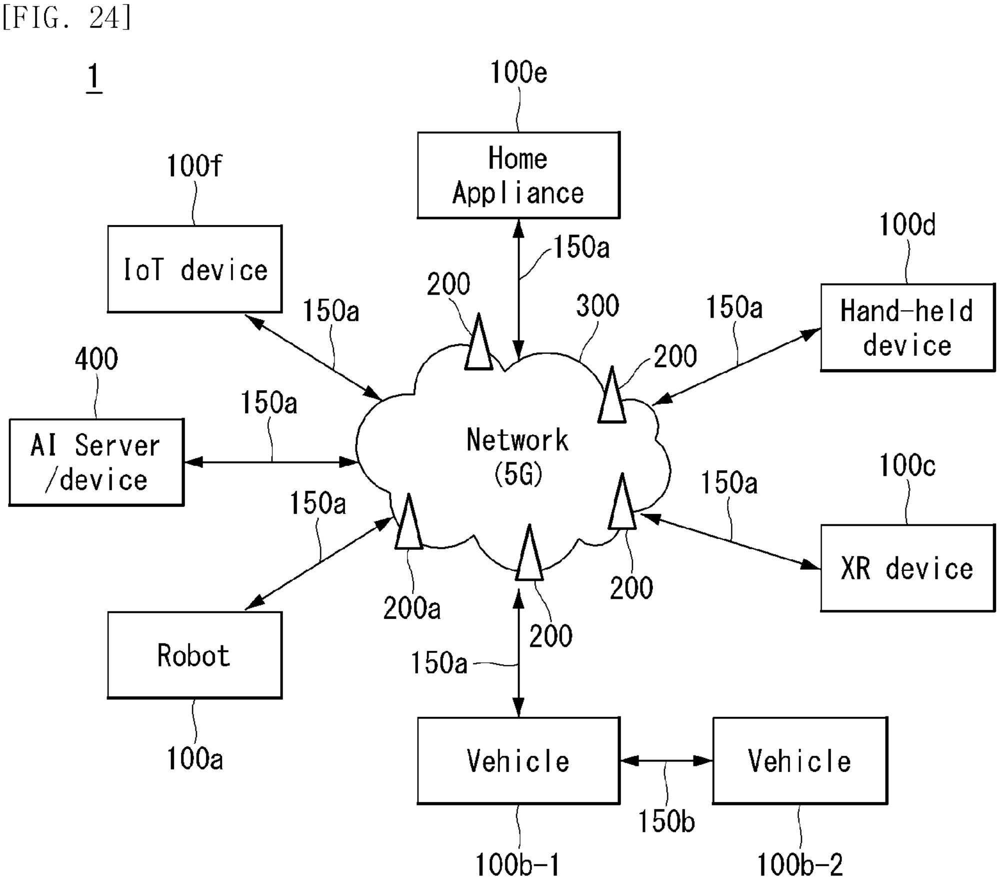

[FIG. 25]
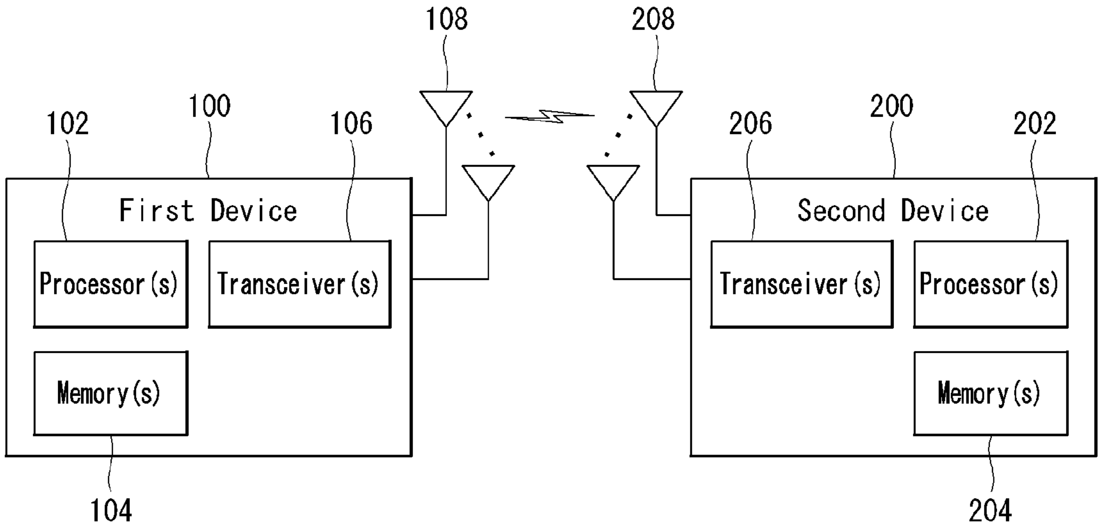

[FIG. 26]
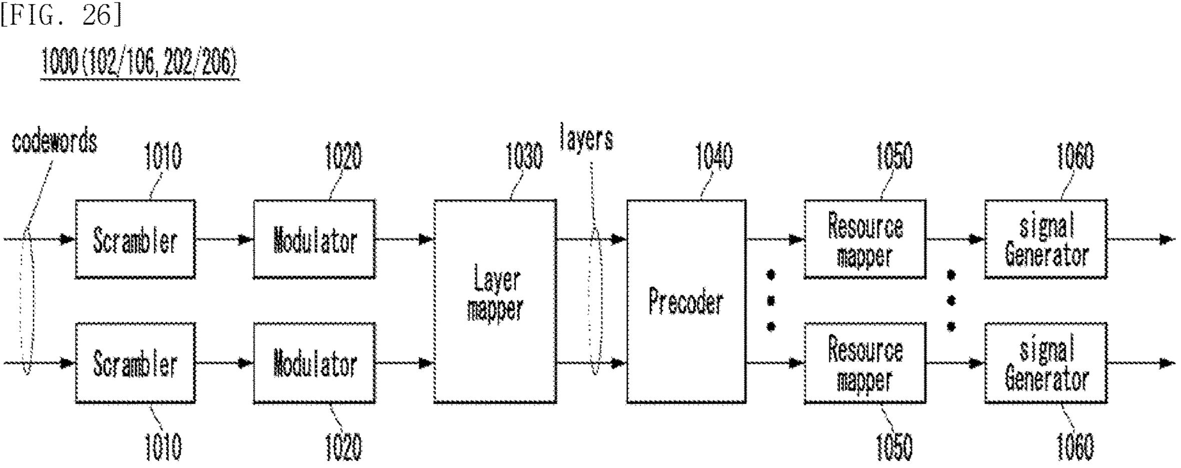

[FIG. 27]
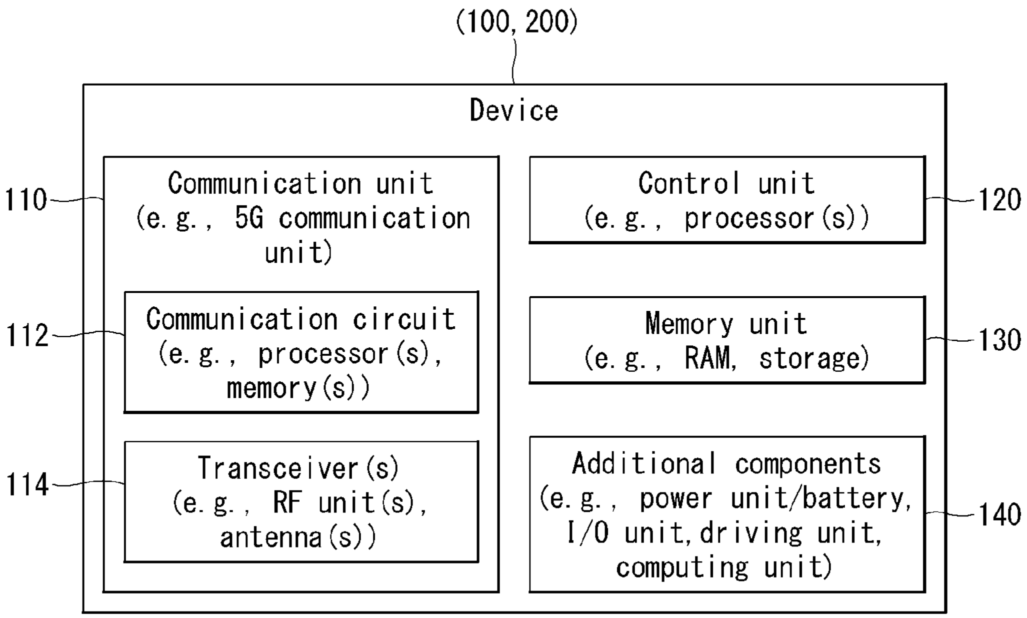

[FIG. 28]
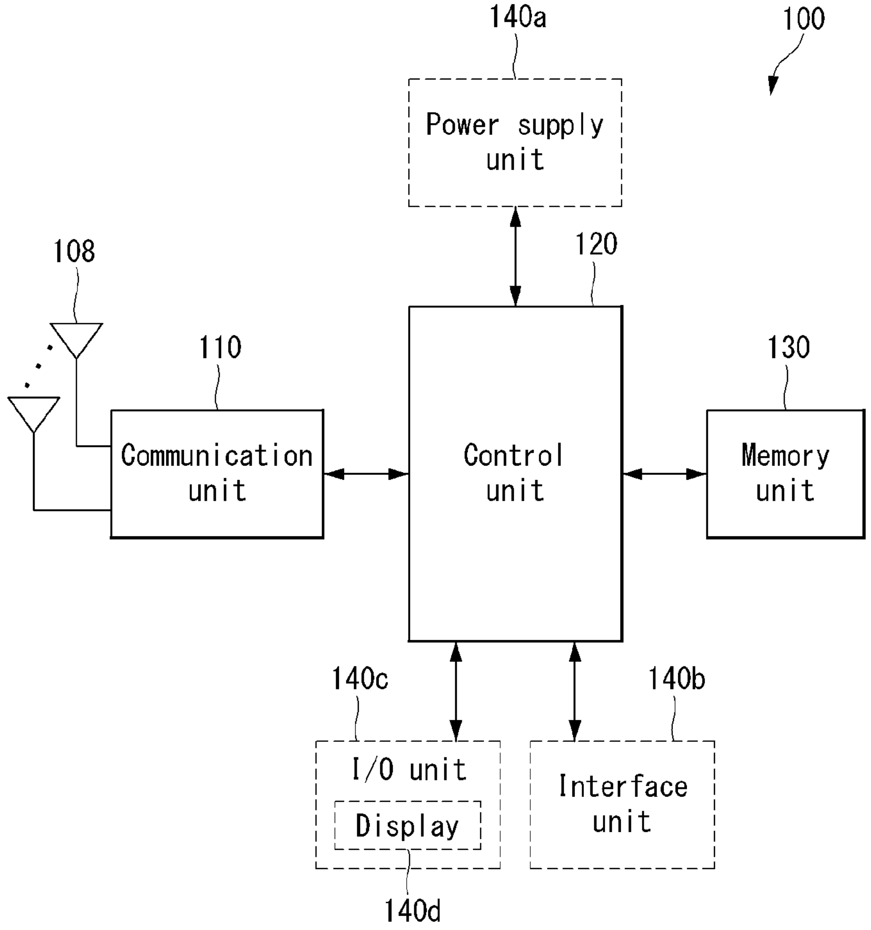

METHOD AND DEVICE FOR SUPPORTING PLURALITY OF FREQUENCY BANDS IN WIRELESS COMMUNICATION SYSTEM

CROSS-REFERENCE TO RELATED APPLICATION(S)

This application is the National Stage filing under 35 U.S.C. 371 of International Application No. PCT/KR2020/013022, filed on Sep. 25, 2020, the contents of which is hereby incorporated by reference herein in its entirety.

TECHNICAL FIELD

The present disclosure relates to a method and a device for supporting a plurality of frequency bands in a wireless communication system.

BACKGROUND

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wideband, and device networking, are researched.

SUMMARY

The present disclosure a method for supporting a plurality of frequency bands.

As a terahertz (THz) band that may be used in a wireless communication system, a band of approximately 100 GHz to 300 GHz is being considered. In the corresponding band, a wide bandwidth may be used and a wavelength is short, so antennas and devices can be miniaturized. However, the band is not suitable for long-distance communication due to rapid path loss, and has a disadvantage that the band is severely attenuated by atmospheric environment, climate, and topography.

Therefore, communication in the THz band may be considered for use based on stand alone mode (SA) indoors or for specific purposes, but from a general point of view, there is a possibility that the communication in the THz band will interlock with a band lower than the THz band (e.g., mmWave, band below 6 GHz) (i.e., Non-Stand Alone (NSA)).

The present disclosure provides a method for supporting a plurality of frequency bands by organically controlling RF units (e.g., transceivers) of a terminal instead of individually controlling the RF units for each frequency band.

The technical objects of the present disclosure are not limited to the aforementioned technical objects, and other technical objects, which are not mentioned above, will be apparently appreciated by a person having ordinary skill in the art from the following description.

In an aspect, provided is a method for supporting, by a terminal, a plurality of frequency bands in a wireless communication system, which includes: receiving connection related information which is related to a plurality of connections (CNs) based on different frequency bands and a reference connection (RCN) related to the plurality of CNs; determining at least one specific CN among the plurality of CNs based on a similarity of a Radio Frequency (RF) characteristic between the RCN and each CN; and transmitting a request message related to the at least one specific CN.

The at least one specific CN is related to a common reference clock, the common reference clock is related to a frequency band transition of a radio signal performed by the terminal, and the request message is related to an off of a resource allocation for transmission of at least one specific downlink signal.

The at least one specific downlink signal may be related to the at least one specific CN.

The at least one specific downlink signal may include at least one of a phase tracking reference signal (PTRS), a channel state information-reference signal (CSI-RS), or a tracking reference signal (TRS).

The RCN may be configured for each resource for transmission of the at least one specific downlink signal.

The RCN may be based on at least one of i) a CN related to a specific frequency band among the plurality of CNs or ii) a CN related to a primary cell (PCell) among the plurality of CNs.

The method may further include: measuring a link quality of each of the plurality of CNs; and transmitting an RCN update request based on the measurement result.

The RCN may be based on any one of the plurality of CNs, and the RCN update request may be transmitted based on the link quality of the RCN being smaller than a specific value.

The similarity of the RF characteristic may be determined based on a predetermined reference, and the predetermined reference may be related to at least one of a frequency offset, a frame timing, or a phase noise.

The specific CN may be a CN, among the plurality of CNs, whose value, based on a difference between i) a common phase noise (CPN) of the corresponding CN and ii) a value acquired by multiplying the CPN of the RCN by a preconfigured first value, is smaller than a CPN threshold value.

The specific CN may be a CN, among the plurality of CNs, whose difference value, between i) a frequency offset of the corresponding CN and ii) a value acquired by multiplying the frequency offset of the RCN by a preconfigured second value, is smaller than an offset threshold value.

The specific CN may be a CN, among the plurality of CNs, whose value, based on a difference between i) a frame timing of the corresponding CN and ii) a frame timing of the RCN, is smaller than a frame timing threshold value.

In another aspect, provided is a terminal for supporting a plurality of frequency bands in a wireless communication system, which includes: one or more transceivers; one or more processors controlling the one or more transceivers; and one or more memories operably connectable to the one or more processors, and storing instructions for performing operations when being executed by the one or more processors, the operations include receiving connection related information which is related to a plurality of connections (CNs) based on different frequency bands and a reference connection (RCN) related to the plurality of CNs; determining at least one specific CN among the plurality of CNs based on a similarity of a Radio Frequency (RF) characteristic between the RCN and each CN; and transmitting a request message related to the at least one specific CN.

The at least one specific CN is related to a common reference clock, the common reference clock is related to a frequency band transition of a radio signal performed by the terminal, and the request message is related to an off of a resource allocation for transmission of at least one specific downlink signal.

In yet another aspect, provided is a device including: one or more memories; and one or more processors functionally connected to the one or more memories.

The one or more processors are configured to control the device to receive connection related information which is related to a plurality of connections (CNs) based on different frequency bands and a reference connection (RCN) related to the plurality of CNs; determine at least one specific CN among the plurality of CNs based on a similarity of a Radio Frequency (RF) characteristic between the RCN and each CN, and transmit a request message related to the at least one specific CN.

The at least one specific CN is related to a common reference clock, the common reference clock is related to a frequency band transition of a radio signal performed by the terminal, and the request message is related to an off of a resource allocation for transmission of at least one specific downlink signal.

In still yet another aspect, provided are one or more non-transitory computer-readable media storing one or more instructions. One or more instructions executable by one or more processors are configured to control a terminal to receive connection related information which is related to a plurality of connections (CN) based on different frequency bands and a reference connection (RCN) related to the plurality of CNs; determine at least one specific CN among the plurality of CNs based on a similarity of a Radio Frequency (RF) characteristic between the RCN and each CN, and transmit a request message related to the at least one specific CN.

The at least one specific CN is related to a common reference clock, the common reference clock is related to a frequency band transition of a radio signal performed by the terminal, and the request message is related to an off of a resource allocation for transmission of at least one specific downlink signal.

In further still yet another aspect, provided is a method for supporting, by a base station, a plurality of frequency bands in a wireless communication system, which includes: transmitting connection related information which is related to a plurality of connections (CNs) based on different frequency bands and a reference connection (RCN) related to the plurality of CNs; and receiving a request message related to at least one specific CN.

The at least one specific CN is determined based on a similarity of a Radio Frequency (RF) characteristic between the RCN and each CN among the plurality of CNs. The at least one specific CN is related to a common reference clock, the common reference clock is related to a frequency band transition of a radio signal performed by the terminal, and the request message is related to an off of a resource allocation for transmission of at least one specific downlink signal.

According to an exemplary embodiment of the present disclosure, at least one specific CN among a plurality of CNs based on different frequency bands is determined. The at least one specific CN is determined based on an RF characteristic similarity with a reference connection (RCN). The at least one specific CN is related to a common reference clock. Accordingly, in transmission and reception of radio signals through a plurality of frequency bands (related to the at least one specific CN), compensation according to RF characteristics (compensation related to phase noise, frequency offset, timing offset, etc.) can be effectively performed based on one reference clock (i.e., the common reference clock). That is, as operations and computations related to the compensation according to the RF characteristics are prevented from being redundantly performed, operation of the terminal can be simplified and power consumption of the terminal can be reduced.

Compensation related to the RF characteristics of the radio signals transmitted and received through the at least one specific CN can be performed based on measurement of signals (e.g., PTRS, CSI-RS, and TRS) received through the RCN. According to an exemplary embodiment of the present disclosure, a request message related to the at least one specific CN is transmitted, and the request message is related to an off of resource allocation for transmission of at least one specific downlink signal. Accordingly, it is possible to improve resource utilization in performing communication through a plurality of frequency bands by turning off unnecessary resource allocation.

Effects which may be obtained from the present disclosure are not limited by the above effects, and other effects that have not been mentioned may be clearly understood from the above description by those skilled in the art to which the present disclosure pertains.

BRIEF DESCRIPTION OF THE DRAWINGS

FIG. 1 illustrates physical channels and general signal transmission used in a 3GPP system.

FIG. 2 is a view showing an example of a communication structure providable in a 6G system applicable to the present disclosure.

FIG. 3 illustrates a structure of a perceptron to which the method proposed in the present disclosure can be applied.

FIG. 4 illustrates the structure of a multilayer perceptron to which the method proposed in the present disclosure can be applied.

FIG. 5 illustrates a structure of a deep neural network to which the method proposed in the present disclosure can be applied.

FIG. 6 illustrates the structure of a convolutional neural network to which the method proposed in the present disclosure can be applied.

FIG. 7 illustrates a filter operation in a convolutional neural network to which the method proposed in the present disclosure can be applied.

FIG. 8 illustrates a neural network structure in which a circular loop to which the method proposed in the present disclosure can be applied.

FIG. 9 illustrates an operation structure of a recurrent neural network to which the method proposed in the present disclosure can be applied.

FIG. 10 is a view showing an electromagnetic spectrum applicable to the present disclosure.

FIG. 11 is a view showing a THz communication method applicable to the present disclosure.

FIG. 12 is a view showing a THz wireless communication transceiver applicable to the present disclosure.

FIG. 13 is a view showing a THz signal generation method applicable to the present disclosure.

FIG. 14 is a view showing a wireless communication transceiver applicable to the present disclosure.

FIG. 15 is a view showing a transmitter structure based on a photonic source applicable to the present disclosure.

FIG. 16 is a view showing an optical modulator structure applicable to the present disclosure.

FIG. 17 illustrates a general structure of an RF unit.

FIG. 18 illustrates a general structure of a frequency synthesizer.

FIG. 19 is a graph showing phase noise generated in the frequency synthesizer.

FIG. 20 illustrates a phase noise signal in a time region generated by the frequency synthesizer.

FIG. 21 illustrates a structure of the RF unit according to an exemplary embodiment of the present disclosure.

FIG. 22 is a flowchart for describing a method for supporting, by a terminal, a plurality of frequency bands in a wireless communication system according to an exemplary embodiment of the present disclosure.

FIG. 23 is a flowchart for describing a method for supporting, by a base station, a plurality of frequency bands in a wireless communication system according to another exemplary embodiment of the present disclosure.

FIG. 24 illustrates a communication system 1 applied to the present disclosure.

FIG. 25 illustrates wireless devices applicable to the present disclosure.

FIG. 26 illustrates a signal process circuit for a transmission signal applied to the present disclosure.

FIG. 27 illustrates another example of a wireless device applied to the present disclosure.

FIG. 28 illustrates a hand-held device applied to the present disclosure.

DETAILED DESCRIPTION

Hereinafter, embodiments disclosed in the present disclosure will be described in detail with reference to the accompanying drawings, but the same or similar components are denoted by the same and similar reference numerals, and redundant descriptions thereof will be omitted. The suffixes "module" and "unit" for components used in the following description are given or used interchangeably in consideration of only the ease of preparation of the specification, and do not have meanings or roles that are distinguished from each other by themselves. In addition, in describing the embodiments disclosed in the present disclosure, when it is determined that a detailed description of related known technologies may obscure the subject matter of the embodiments disclosed in the present disclosure, the detailed description thereof will be omitted. In addition, the accompanying drawings are for easy understanding of the embodiments disclosed in the present disclosure, and the technical idea disclosed in the present disclosure is not limited by the accompanying drawings, and all modifications included in the spirit and scope of the present disclosure, It should be understood to include equivalents or substitutes.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

For clarity, the description is based on a 3GPP communication system (eg, LTE, NR, etc.), but the technical idea of the present disclosure is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. 3GPP 6G may mean technology after TS Release 17 and/or Release 18. "xxx" means standard document detail number. LTE/NR/6G may be collectively referred to as a 3GPP system. Background art, terms, abbreviations, and the like used in the description of the present disclosure may refer to matters described in standard documents published before the present disclosure. For example, you can refer to the following document:

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification Physical Channel and Frame Structure Physical Channels and General Signal Transmission FIG. 1 illustrates physical channels and general signal transmission used in a 3GPP system. In a wireless communication system, a terminal receives information from a base station through a downlink (DL), and the terminal transmits information to the base station through an uplink (UL). The information transmitted and received by the base station and the terminal includes data and various control information, and various physical channels exist according to the type/use of information transmitted and received by them.

When the terminal is powered on or newly enters a cell, the terminal performs an initial cell search operation such as synchronizing with the base station (S101). To this end, the UE receives a Primary Synchronization Signal (PSS) and a Secondary Synchronization Signal (SSS) from the base station to synchronize with the base station and obtain information such as cell ID. Thereafter, the terminal may receive a physical broadcast channel (PBCH) from the base station to obtain intra-cell broadcast information. Meanwhile, the UE may receive a downlink reference signal (DL RS) in the initial cell search step to check a downlink channel state.

After completing the initial cell search, the UE receives a physical downlink control channel (PDCCH) and a physical downlink shared channel (PDSCH) according to the information carried on the PDCCH, thereby receiving a more specific system Information can be obtained (S102).

On the other hand, when accessing the base station for the first time or when there is no radio resource for signal transmission, the terminal may perform a random access procedure (RACH) for the base station (S103 to S106). To this end, the UE transmits a specific sequence as a preamble through a physical random access channel (PRACH) (S103 and S105), and a response message to the preamble through a PDCCH and a corresponding PDSCH (RAR (Random Access Response) message) In the case of contention-based RACH, a contention resolution procedure may be additionally performed (S106).

After performing the above-described procedure, the UE receives PDCCH/PDSCH (S107) and physical uplink shared channel (PUSCH)/physical uplink control channel as a general uplink/downlink signal transmission procedure. (Physical Uplink Control Channel; PUCCH) transmission (S108) can be performed. In particular, the terminal may receive downlink control information (DCI) through the PDCCH. Here, the DCI includes control information such as resource allocation information for the terminal, and different formats may be applied according to the purpose of use.

On the other hand, control information transmitted by the terminal to the base station through uplink or received by the terminal from the base station is a downlink/uplink ACK/NACK signal, a channel quality indicator (CQI), a precoding matrix index (PMI), and (Rank Indicator) may be included. The terminal may transmit control information such as CQI/PMI/RI described above through PUSCH and/or PUCCH.

Structure of Uplink and Downlink Channels

Downlink Channel Structure

The base station transmits a related signal to the terminal through a downlink channel to be described later, and the terminal receives a related signal from the base station through a downlink channel to be described later.

(1) Physical Downlink Shared Channel (PDSCH)

PDSCH carries downlink data (eg, DL-shared channel transport block, DL-SCH TB), and includes Quadrature Phase Shift Keying (QPSK), Quadrature Amplitude Modulation (QAM), 64 QAM, 256 QAM, etc. The modulation method is applied. A codeword is generated by encoding TB. The PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 Control Channel Elements (CCEs) according to the Aggregation Level (AL). One CCE consists of 6 REGs (Resource Element Group). One REG is defined by one OFDM symbol and one (P)RB.

The UE acquires DCI transmitted through the PDCCH by performing decoding (aka, blind decoding) on the set of PDCCH candidates. The set of PDCCH candidates decoded by the UE is defined as a PDCCH search space set. The search space set may be a common search space or a UE-specific search space. The UE may acquire DCI by monitoring PDCCH candidates in one or more search space sets set by MIB or higher layer signaling.

Uplink Channel Structure

The terminal transmits a related signal to the base station through an uplink channel to be described later, and the base station receives a related signal from the terminal through an uplink channel to be described later.

(1) Physical Uplink Shared Channel (PUSCH)

PUSCH carries uplink data (eg, UL-shared channel transport block, UL-SCH TB) and/or uplink control information (UCI), and CP-OFDM (Cyclic Prefix—Orthogonal Frequency Division Multiplexing) waveform (waveform), DFT-s-OFDM (Discrete Fourier Transform-spread-Orthogonal Frequency Division Multiplexing) is transmitted based on the waveform. When the PUSCH is transmitted based on the DFT-s-OFDM waveform, the UE transmits the PUSCH by applying transform precoding. For example, when transform precoding is not possible (eg, transform precoding is disabled), the UE transmits a PUSCH based on the CP-OFDM waveform, and when transform precoding is possible (eg, transform precoding is enabled), the UE is CP-OFDM. PUSCH may be transmitted based on a waveform or a DFT-s-OFDM waveform. PUSCH transmission is dynamically scheduled by the UL grant in the DCI or is semi-static based on higher layer (e.g., RRC) signaling (and/or Layer 1 (L1) signaling (e.g., PDCCH)). Can be scheduled (configured grant). PUSCH transmission may be performed based on a codebook or a non-codebook.

(2) Physical Uplink Control Channel (PUCCH)

The PUCCH carries uplink control information, HARQ-ACK, and/or scheduling request (SR), and may be divided into a plurality of PUCCHs according to the PUCCH transmission length.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as “intelligent connectivity”, “deep connectivity”, “holographic connectivity” and “ubiquitous connectivity”, and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

FIG. 2 is a view showing an example of a communication structure providable in a 6G system applicable to the present disclosure.

Referring to FIG. 2, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

- Satellites integrated network: To provide a global mobile group, 6G will be integrated with satellite. Integrating terrestrial waves, satellites and public networks as one wireless communication system may be very important for 6G.
- Connected intelligence: Unlike the wireless communication systems of previous generations, 6G is innovative and wireless evolution may be updated from “connected things” to “connected intelligence”. AI may be applied in each step (or each signal processing procedure which will be described below) of a communication procedure.
- Seamless integration of wireless information and energy transfer: A 6G wireless network may transfer power in order to charge the batteries of devices such as smartphones and sensors. Therefore, wireless information and energy transfer (WIET) will be integrated.
- Ubiquitous super 3-dimension connectivity: Access to networks and core network functions of drones and very low earth orbit satellites will establish super 3D connection in 6G ubiquitous.

In the new network characteristics of 6G, several general requirements may be as follows.

- Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.
- Ultra-dense heterogeneous network: Ultra-dense heterogeneous networks will be another important characteristic of the 6G communication system. A multi-tier network composed of heterogeneous networks improves overall QoS and reduce costs.
- High-capacity backhaul: Backhaul connection is characterized by a high-capacity backhaul network in order to support high-capacity traffic. A high-speed optical fiber and free space optical (FSO) system may be a possible solution for this problem.
- Radar technology integrated with mobile technology: High-precision localization (or location-based service) through communication is one of the functions of the 6G wireless communication system. Accordingly, the radar system will be integrated with the 6G network.
- Softwarization and virtualization: Softwarization and virtualization are two important functions which are the bases of a design process in a 5 GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

FIG. 3 illustrates a structure of a perceptron to which the method proposed in the present disclosure can be applied.

Referring to FIG. 3, when an input vector x=(x1, x2, . . . , xd) is input, each component is multiplied by a weight (W1, W2, . . . , Wd), and all the results are summed. After that, the entire process of applying the activation function σ(•) is called a perceptron. The huge artificial neural network structure may extend the simplified perceptron structure shown in FIG. 3 to apply input vectors to different multi-dimensional perceptrons. For convenience of explanation, an input value or an output value is referred to as a node.

Meanwhile, the perceptron structure illustrated in FIG. 3 may be described as being composed of a total of three layers based on an input value and an output value. An artificial neural network in which H (d+1) dimensional perceptrons exist between the 1st layer and the 2nd layer, and K (H+1) dimensional perceptrons exist between the 2nd layer and the 3rd layer, as shown in FIG. 4.

FIG. 4 illustrates the structure of a multilayer perceptron to which the method proposed in the present disclosure can be applied.

The layer where the input vector is located is called an input layer, the layer where the final output value is located is called the output layer, and all layers located between the input layer and the output layer are called a hidden layer. In the example of FIG. 4, three layers are disclosed, but since the number of layers of the artificial neural network is counted excluding the input layer, it can be viewed as a total of two layers. The artificial neural network is constructed by connecting the perceptrons of the basic blocks in two dimensions.

The above-described input layer, hidden layer, and output layer can be jointly applied in various artificial neural network structures such as CNN and RNN to be described later as well as multilayer perceptrons. The greater the number of hidden layers, the deeper the artificial neural network is, and the machine learning paradigm that uses the deep enough artificial neural network as a learning model is called Deep Learning. In addition, the artificial neural network used for deep learning is called a deep neural network (DNN).

FIG. 5 illustrates a structure of a deep neural network to which the method proposed in the present disclosure can be applied.

The deep neural network shown in FIG. 5 is a multilayer perceptron composed of eight hidden layers+output layers.

The multilayer perceptron structure is expressed as a fully-connected neural network. In a fully connected neural network, a connection relationship does not exist between nodes located on the same layer, and a connection relationship exists only between nodes located on adjacent layers. DNN has a fully connected neural network structure and is composed of a combination of multiple hidden layers and activation functions, so it can be usefully applied to understand the correlation characteristics between input and output. Here, the correlation characteristic may mean a joint probability of input/output.

'On the other hand, depending on how the plurality of perceptrons are connected to each other, various artificial neural network structures different from the aforementioned DNN can be formed.

In a DNN, nodes located inside one layer are arranged in a one-dimensional vertical direction. However, in FIG. 6, it may be assumed that w nodes are arranged in two dimensions, and h nodes are arranged in a two-dimensional manner (convolutional neural network structure of FIG. 6). In this case, since a weight is added per connection in the connection process from one input node to the hidden layer, a total of h×w weights must be considered. Since there are h×w nodes in the input layer, a total of h2w2 weights are required between two adjacent layers.

FIG. 6 illustrates the structure of a convolutional neural network to which the method proposed in the present disclosure can be applied.

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

FIG. 7 illustrates a filter operation in a convolutional neural network to which the method proposed in the present disclosure can be applied.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

FIG. 8 illustrates a neural network structure in which a circular loop to which the method proposed in the present disclosure can be applied.

Referring to FIG. 8, a recurrent neural network (RNN) is a fully connected neural network with elements (x1(t), x2(t), . . . , xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

FIG. 9 illustrates an operation structure of a recurrent neural network to which the method proposed in the present disclosure can be applied.

Referring to FIG. 9, the recurrent neural network operates in a predetermined order of time with respect to an input data sequence.

Hidden vectors (z1(1), z2(1), . . . , zH(1)) is input with the input vector (x1(2), x2(2), . . . , xd(2)) of the time point 2, and the vector (z1(2), z2(2), . . . , zH(2)) is determined. This process is repeatedly performed up to the time point 2, time point 3, time point T.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

In recent years, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver rather than a traditional communication framework in the fundamental signal processing and communication mechanism. For example, deep learning-based channel coding and decoding, deep learning-based signal estimation and detection, deep learning-based MIMO mechanism, AI-based resource scheduling, and It may include allocation and the like.

Terahertz (THz) Communication

THz communication is applicable to the 6G system. For example, a data rate may increase by increasing bandwidth.

This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communications in General

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

FIG. 11 is a view showing a THz communication method applicable to the present disclosure.

Referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below shows an example of technology which may be used in the THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The THz generation method can be classified as an optical device or an electronic device-based technology.

FIG. 12 is a view showing a THz wireless communication transceiver applicable to the present disclosure.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

FIG. 13 is a view showing a THz signal generation method applicable to the present disclosure and FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

The structure of a photoelectric converter (or photoelectric converter) will be described with reference to FIGS. 15 and 16. FIG. 15 is a view showing a transmitter structure based on a photonic source applicable to the present disclosure. FIG. 16 is a view showing an optical modulator structure applicable to the present disclosure.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (OLE converter) may generate THz pulses according to optical rectification operation by a nonlinear crystal, photoelectric conversion (OLE conversion) by a photoconductive antenna, and emission from a bunch of relativistic electrons. The terahertz pulse (THz pulse) generated in the above manner may have a length of a unit from femto second to pico second. The photoelectric converter (OLE converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

The aforementioned contents may be combined with subsequent embodiments proposed in the present disclosure and applied or may be supplemented to clarify technical characteristics of the embodiments proposed in the present disclosure. Hereinafter, the embodiments to be described hereinafter have been divided for convenience of description only, and some elements of any one embodiment may be substituted with some elements of another embodiment or may be mutually combined and applied.

Symbols/abbreviations/terms used in relation to exemplary embodiments of the present disclosure to be described below are as follows.

CN: Connection

RCN: Reference connection

PTRS: Phase Tracking Reference Signal

CPN: Common phase noise $CLK_{ref}$: Reference clock

Hereinafter, in the present disclosure, an efficient RF composite structure capable of simultaneously transmitting and receiving multiple bands in a multi-band wireless communication system including a Thz band is provided and a method of utilizing the same is proposed.

As a Thz wireless communication band that can be used in a wireless communication system, a band of approximately 100 GHz to 300 GHz is being considered. In this band, a wide bandwidth may be used and the wavelength is short, so antennas and devices can be miniaturized. However, the band is not suitable for long-distance communication due to rapid path loss, and has a disadvantage that the band is severely attenuated by atmospheric environment, climate, and topography.

Therefore, communication in the THz band may be considered for use based on stand alone mode (SA) indoors or for specific purposes, but from a general point of view, there is a possibility that the communication in the Thz band will interlock with a band lower than the THz band (e.g., mmWave, band below 6 GHz) (i.e., Non-Stand Alone (NSA)).

In the present disclosure, proposed is a method in which rather than independently operating the RF units (e.g., the transceiver 106/206 of FIG. 25 to be described later) for each band in this environment, the RF units are organically operated together to reduce redundant calculations and operations to reduce power consumption, and increase spectral efficacy through resource efficiency.

Hereinafter, in FIGS. 17 to 21, a structure of an RF unit according to an exemplary embodiment of the present disclosure will be described.

FIG. 17 illustrates a general structure of an RF unit.

Referring to FIG. 17, the RF unit may include a baseband signal processing unit, a digital to analog converter (DAC), an analog to digital converter (ADC), a unit for modulation and demodulation, a bandpass filter (BPF), an amplifier (or attenuator), a beamformer, and an antenna.

The baseband signal processing unit generates a radio signal in a baseband.

The DAC and the ADC perform conversion between a digital signal and an analog signal.

The modulation/demodulation unit includes a modulation unit and a demodulation unit, and performs transition to a specific frequency band.

The bandpass filter passes only a signal of a specific band.

The amplifier (or attenuator) adjusts a magnitude of the signal.

The beamformer performs analog beamforming. The beamformer may be implemented as a phase shifter.

A frequency synthesizer of the RF unit generates all frequency signals for the entire operation of the corresponding RF unit from a signal of $CLK_{ref}$. In the case of direct conversion in a modulation/demodulation process, a 'modulation/demodulation high' block of the RF unit may be omitted.

As in the structure of FIG. 17 described above, hardware (HW) (i.e., the antenna, the bandpass filter, a specific block such as modulation/demodulation, etc.) of the RF unit is determined according to the frequency band. In other words, in order for the RF unit to operate in a frequency band other than the frequency band in which the RF unit already operates, the hardware (HW) of the corresponding RF unit must also be changed.

As a specific example, an antenna used in a Thz signal band may not be used in a 6 Ghz band. This is because it is impossible to manufacture an antenna whose usable band ranges from GHz to THz according to current broadband antenna manufacturing technology.

In order to design an RF unit capable of transmitting and receiving in a plurality of bands, the following method may be considered. Specifically, a method for designing an RF structure for transmitting and receiving each band by arranging a plurality of structures of FIG. 17 or a method for designing an RF structure for selectively using a specific RF unit among a plurality of RF units may be considered.

Here, the RF structure for selective use may include components related to a band characteristic and a frequency synthesizer for selectively controlling (or using) the specific components. The specific components may include components (e.g., a low pass filter (LPF), a bandpass filter (BPF), and a beam generator) designed to be suitable for each band among a plurality of frequency bands. The frequency synthesizer generates and provides a frequency signal of a specific band, so that the components related to the band characteristic may be selectively controlled.

The above method selectively uses one RF unit in multiple bands. However, the method may not support multiple connections (hereinafter, referred to as CNs) in the Thz band. Here, the CN refers to any wireless communication system in which physical channels for wireless communication such as carrier aggregation (CA) and different heterogeneous networks (e.g., WiFi, LTE) exist.

The present disclosure provides a structure of an RF unit (e.g., the transceiver) capable of utilizing a common characteristic of bands related to each CN when a multi-CN situation is assumed. In addition, the present disclosure proposes a method in which a terminal equipped with the RF unit may utilize the common characteristic of the bands related to each CN when performing communication based on the plurality of CNs.

Effects of a characteristic generated in an RF stage on the baseband signal may be divided into phase noise, frequency offset, gain control, time tracking, IQ imbalance, and a non-linear characteristic of a Power Amplifier (PA).

Among those listed above, the effects generated by the frequency synthesizer are the phase noise, the frequency offset, and the time tracking. In the modulation/demodulation process, the effect is the IQ imbalance, and the effect by an AMP characteristic is the gain control and the non-linear characteristic of the PA. In particular, since the effect of the baseband signal generated from the frequency synthesizer may cause a lot of loss in reception performance, detailed compensation and tuning are required.

FIG. 18 illustrates a general structure of a frequency synthesizer.

Referring to FIG. 18, the frequency synthesizer may include a phase detector (PD), a loop filter (or lowpass filter, LPF), a voltage controlled oscillator (VCO), a frequency multiplier, and a frequency divider. The frequency multiplier outputs a frequency multiplied by an integer multiple (e.g., N times). The frequency divider generates an output frequency that is a fractional multiple (e.g., 1/M) of an input frequency.

A typical oscillator device for generating a reference clock $CLK_{ref}$ includes a temperature compensated crystal oscillator (TCXO). This acts as a factor that changes the frequency of the reference clock $CLK_{ref}$ based on the magnitude of an input voltage (Vctrl). Frequency offset correction in the wireless communication system is performed by correcting the frequency of the reference clock $CLK_{ref}$. An output frequency fout of the frequency synthesizer is N times a frequency output from the voltage controlled oscillator (VCO). On the other hand, the phase noise generated by the frequency synthesizer requires proper compensation processing in the baseband signal. In 5G NR, common phase noise (CPN) is compensated by using a Phase Tracking Reference Signal (PTRS).

FIG. 19 is a graph showing phase noise generated in the frequency synthesizer. Specifically, FIG. 19 illustrates phase noise generated in the frequency synthesizer for each frequency offset.

FIG. 20 illustrates a phase noise signal in a time region generated by the frequency synthesizer.

Specifically, FIG. 20 illustrates a phase noise signal in the time region generated by a frequency synthesizer having a power spectrum density (PSD) as illustrated in FIG. 19. Here, the CPN is an average phase shown in a data symbol period, and is determined by a phase characteristic of the in-band (low frequency offset) of the phase noise.

The phase noise of the in-band is caused by the phase of the reference clock $CLK_{ref}$ and a noise characteristic of the loop filter (LF). Therefore, when the common reference clock $CLK_{ref}$ is shared, a tendency of the CPN may appear similar.

If systems based on a plurality of CNs have a 'dependent relationship' with each other, when the terminal performs band transition using the same reference clock, phase noise features of the two systems measured in the corresponding terminal may appear similar. Here, the dependent relationship may mean that the systems are synchronized with each other and the reference clock is shared.

On the other hand, if different (independent) RF structures (i.e., structures of RF units) are used in the systems based on the plurality of CNs, the phase noise characteristics in the terminal may be measured differently.

According to the above-described contents, whether characteristics of phase noise of radio signals received by the terminal from base station(s) based on the plurality of CNs appear similar may be determined based on the following i) and ii).

i) Whether a plurality of base stations based on the plurality of CNs share the reference clock ii) Whether the terminal uses the same reference clock for (base stations based on) CNs in which the corresponding reference clock is shared The terminal may receive information related to i) from one of the base stations based on the plurality of CNs. The terminal may determine the RF characteristic similarity between the plurality of CNs based on the information related to i), and based on this, determine (at least one) specific CN to use the same reference clock among the plurality of CNs.

If the characteristics of two phase noises are similar, the phase noise of the other band (related to one of the remaining CNs) may be corrected only by estimating the phase noise characteristic for a specific band (related to any one of the plurality of CNs sharing the reference clock). Accordingly, unnecessary PTRS resource allocation may be reduced. That is, the PTRS may be transmitted only through the CN related to the specific band among the plurality of CNs, and resource allocation for PTRS related to the other remaining CN(s) may be turned off.

For the above reasons, the base station (and/or terminal) may signal information related to the similarity of the RF characteristics (the phase noise characteristic, the frequency offset, the system timing, etc.) related to the plurality of CNs to the terminal (and/or the base station).

On the other hand, when the systems based on the plurality of CNs are not dependent on each other (e.g., when different heterogeneous networks (WiFi, NR, 6G communication) are provided separately, and the related information including characteristics by distributed-location and transmitted through a medium such as a repeater), (the base station/terminal related to) each system must perform a unique signal restoration procedure for data transmission and reception. That is, the characteristics such as the frequency offset, the phase noise, and the time offset must be compensated for each system based on the plurality of CNs. As an example, an automatic frequency control (AFC) may be performed for each system.

A structure of the RF unit of the terminal to simultaneously consider the two situations (situations in which the systems based on the plurality of CNs are mutually dependent and independent) will be described below with reference to FIG. 21.

FIG. 21 illustrates a structure of the RF unit according to an exemplary embodiment of the present disclosure. Referring to FIG. 21, the RF unit according to an exemplary embodiment of the present disclosure may include a band similarity determination unit and an AFC control unit/$CLK_{ref}$ selection unit.

The band similarity determination unit determines a dependent relationship between bands based on the plurality of CNs. A specific method related to determining whether the dependent relationship exists will be described later.

The AFC control unit/$CLK_{ref}$ selection unit (hereinafter referred to as the control unit) determines whether to use $CLK_{ref\_org}$ in components (DAC/ADC, PLL, modulation/demodulation unit, beam generator) for each frequency band (f1, f2, . . . , fn) based on the determination of the dependent relationship. The control unit controls components for each frequency band (f1, f2, . . . , fn) to use $CLK_{ref\_1}$~$CLK_{ref\_n}$ or $CLK_{ref\_org}$ related to the corresponding frequency band.

Here, $CLK_{ref\_org}$ may mean an oscillator that generates the common reference clock. $CLK_{ref\_1}$ to $CLK_{ref\_n}$ may mean an oscillator that generates a reference clock related to each frequency band (f1, f2, . . . , fn).

That is, when a certain band is determined to be dependent, the control unit controls $CLK_{ref\_org}$ to be used in components related to the band. The AFC of the corresponding frequency band is performed by frequency correction of $CLK_{ref\_org}$. Information on the dependent relationship of each frequency band may be signaled from the base station.

For example, if the band similarity determination unit determines that f1 and f2 are in the 'dependent relationship' with each other, the control unit controls $CLK_{ref\_org}$ to be used in the RF components (the DAC/ADC, the modulation/demodulation unit, etc.) of f1 and f2. Specifically, the control unit controls the clock (i.e., the common reference clock) generated by the frequency synthesizer to be input to a phase locked loop (PLL) related to f1 and f2. The control unit performs the automatic frequency control (AFC) through correction of $CLK_{ref\_org}$ (that is, correction of the common reference clock).

Among the plurality of bands based on the plurality of CNs, an output of $CLK_{ref\_n}$ (n={3 . . . n}) related to the corresponding band is used as an input in the phase locked loop (PLL) of the remaining band(s) other than the bands having the dependent relationship. The frequency correction for the AFC is also performed in each band (through $CLK_{ref\_n}$ correction related to the corresponding band).

In terms of implementation, the RF unit of FIG. 21 according to the above-described exemplary embodiments may be implemented by devices according to FIGS. 24 to 28 to be described later. For example, the RF unit of FIG. 21 may be implemented by the processor 102/202 and the transceiver 106/206 of FIG. 25. Specifically, the band similarity determination unit and the control unit may be implemented by the processor 102/202 of FIG. 25, and the other remaining components (DAC/ADC, PLL, beam generator, etc.) may be implemented by the transceiver 106/206 of FIG. 25.

In addition, operations (e.g., operations related to the above-described RF structure) of the device according to the above-described exemplary embodiment may be stored in the memory (e.g., 104 and 204 of FIG. 25) in the form of instructions/programs (e.g., instruction, executable code) for driving at least one processor (e.g., 102 and 202 of FIG. 25).

Hereinafter, an operation between the terminal equipped with the RF unit and the base station(s) related to the plurality of CNs will be described in detail.

Depending on whether there is the dependent relationship between the systems based on each CN among the plurality of CNs, it is necessary to transfer the RF characteristic similarity or RCN configuration information between the base station and the terminal.

That is, when the terminal 1) determines that at least one specific CN among the plurality of CNs is in a mutually dependent relationship, and 2) determines that the reference clock is commonly used related to the RF unit (i.e., the common reference clock is used), the terminal may operate as follows.

The UE may determine a connection (hereinafter, referred to as a reference connection, RCN) which becomes a reference among the plurality of CNs. For efficiency of resource utilization, the terminal may request the base station to turn off resource allocation for the remaining CN(s) other than the RCN. The base station may be any one base station among base stations based on the plurality of CNs. Here, the RCN may be defined/configured for each resource for transmission of a (downlink) signal to be described later.

In addition, the terminal may perform the automatic frequency control (AFC) and the timing control in units of dependent CN groups having the dependent relationship. The CN group may include at least one specific CN having the mutually dependent relationship among the plurality of CNs.

In this case, the type of signal related to a resource allocation off request may be based on phase noise and a reference signal for maintaining a link related to tracking. The reference signal may include at least one of a Phase Tracking Reference Signal (PTRS), a Channel State Information-Reference Signal (CSI-RS), or a Tracking Reference Signal (TRS). The RCN may be configured/defined for each PTRS resource, CSI-RS resource, and TRS resource.

The resource allocation off request may include information related to the CN group. Specifically, the resource allocation off request (message) may include information about the at least one specific CN.

In addition, the RCN for the resource allocation off request may be determined (defined) according to the following criteria.

1) The base station may list the connection types and define the CN group. Accordingly, the base station may define the RCN.

2) The RCN may be defined among the plurality of CNs.

As an example, the RCN may be defined based on a connection of the highest (or lowest) frequency band. As another example, the RCN may be defined based on a primary cell (PCell) of a master cell group (MCG) or a secondary cell group (SCG). As yet another example, the RCN may be defined within the CN group. The RCN may be defined based on a combination of one or more of the examples.

When the base station lists the connection types and defines the RCN, the RCN may be changed due to special circumstances such as rapid signal instability of the reference connection. Such RCN replacement (update) may be performed through a request from the terminal or signaling from the base station.

Hereinafter, specific application examples of the above-described exemplary embodiments will be described.

The specific application examples will be described below by assuming that f1 is Thz communication, f2 is mmWave communication, f3 is WiFi, and f4 is LTE. The f1 to f4 may be related to different frequency bands (each CN among the plurality of CNs).

If f1 and f2 exist in the same location and share synchronization and reference clocks, and f3 and f4 are provided in different locations, it may be determined that f1 and f2 have the dependent relationship, and f3 and f4 have a non-dependent relationship.

At this time, the CN group includes f1 and f2, and it is possible to designate and use the RCN as f1.

An example of an operation procedure in the base station and the terminal according to the structure of the RF unit and related operation information described above in a multi-CN situation is as follows.

- The base station transmits information on the CN group according to the configuration of the plurality of CNs and the RCN for each CN group to the terminal.
- The terminal determines the degree of similarity by measuring the RF characteristics of the RCN and the remaining CNs within the CN group. For similarity determination, CN groups share and use the reference clocks.

At a certain time t, for the i-th CN $CN_i$ in the CN group, the terminal may perform similarity determination as follows. Specifically, the terminal may perform similarity determination related to the frequency offset, the phase noise, and the frame timing (or timing offset).

The terminal may perform similarity determination related to a frequency offset Foffset as follows.

The terminal may 1) determine that $Foffset_{CNi} \approx Foffset_{RCN}$ (i.e., determine that the frequency offset of the RCN and the frequency offset of the corresponding CN) when $abs\{Foffset_{CNi}(t) - \alpha_i \times FOffset_{RCN}(t)\} < th_{freq}$ and 2) if not, determine that $Foffset_{CNi} \neq Foffset_{RCN}$ (determine that the frequency offset of the RCN and the frequency offset of the corresponding CN are not similar).

Here, $\alpha_i$ may be a predefined value as a constant. As an example, $\alpha_i$ may be (center frequency of CNi)/(center frequency of RCN). $th_{freq}$ a boundary value for determining a similarity of the frequency offset. $th_{freq}$ may be configured in the UE by the base station or predefined as a system requirement. Foffset(t) For Foffset(t) calculation, a time-averaged value may be used.

The terminal may perform similarity determination related to the phase noise based on common phase noise (CPN).

The terminal may 1) determine that $CPN_{CNi} \approx CPN_{RCN}$ (i.e., determine that the phase noise of the RCN and the phase noise of the corresponding CN) $E[abs\{CPN_{CNi}(t) - \beta_i \times CPN_{RCN}(t)\}] < th_{CPN}$ and 2) if not, determine that $CPN_{CNi} \neq CPN_{RCN}$ (determine that the phase noise of the RCN and the phase noise of the corresponding CN are not similar).

Here, $\beta_i$ may be the predefined value as the constant. For example, $\beta_i$ may be (center frequency of CNi)/(center frequency of RCN). $th_{CPN}$ is a boundary value (threshold value) for determining the similarity of the phase noise. $th_{CPN}$ may be configured in the UE by the base station or predefined as the system requirement. E[ ] means a time average.

The terminal may perform similarity determination of frame timing (FT) (or timing offset) as follows.

The terminal 1) determines that $FT_{CNi} \approx FT_{RCN}$ when $Var[FT_{CNi} - FT_{RCN}] < th_{FT}$ (that is, determines that the timing offset of the RCN and the corresponding CN are similar), and 2) if not, determines that $FT_{CNi} \neq FT_{RCN}$ (the timing offset of the RCN and the timing offset of the corresponding CN are not similar).

Here, Var[ ] means variance, and $th_{FT}$ is a boundary value (threshold value) for determining the similarity of the timing offset. $th_{FT}$ may be configured in the UE by the base station or predefined as the system requirement.

The UE may determine whether to commonly use the reference clock for each CN within the CN group based on a predefined condition. The predefined condition may be related to the measured similarity. Specifically, the predefined condition may be defined based on at least one of a similarity related to Foffset, a similarity related to the phase noise, or a similarity related to the frame timing.

As an example, the predefined condition may be {Similar to Foffset, Similar to Phase Noise}. The terminal may determine that the reference clock is commonly used (i.e., the common reference clock is used) for specific CNs having an Foffset and phase noise similar to the RCN among the CNs in the CN group.

As another example, the predefined condition may be {Similar to Foffset, Similar to Frame timing, Similar to Phase Noise}. The terminal may determine that the reference clock is commonly used (the common reference clock is used) for specific CNs having Foffset, frame timing, and phase noise similar to the RCN among the CNs in the CN group.

As yet another example, the predefined condition may be {similar to phase noise}. The terminal may determine that the reference clock is commonly used (the common reference clock is used) for specific CNs having phase noise similar to the RCN among the CNs in the CN group.

The terminal proceeds with a resource allocation off request for a CN set (i.e., the specific CNs) in which the common reference clock is used. The terminal may transmit a request message related to the CN set to the base station. The request message may be related to off of resource allocation for a specific downlink signal related to the specific CNs. The transmission of the request message may be performed through the RCN.

The base station performs the resource allocation off for the corresponding CN according to the 'resource allocation off request (request message)' reported for each CN group.

The UE measures link quality (Q-CN) for each CN in the CN group. The measured link quality may be based on at least one of a Signal to Noise Ratio (SNR) or a Frame Error Rate (FER). When the link quality of the RCN is lower than those of other CNs (in the case of $Q_{RCN}<\max\{Q_{CNi}\}-Th_Q$), the terminal transmits a message related to an update of the RCN to the base station. The message related to the RCN update includes information on candidate CNs for the RCN update.

Here, $Q_{CNi}$ may indicate the link quality of other CNs other than the RCN, and may be configured in the terminal by the base station or predefined as a boundary condition for determining whether the RCN needs to be updated.

The base station replaces (updates) the RCN based on the information of the candidate CN and transmits the information of the corresponding RCN to the terminal.

The base station may arbitrarily switch an RCN update process based on $Q_{CNi}$ of the candidate CN transmitted by the terminal.

In terms of implementation, the operations (e.g., the above-described structure of the RF unit and signaling operations related thereto) of the base station/terminal according to the above-described exemplary embodiments are processed by the devices of FIGS. 24 to 28 (e.g., the processors 102 and 202 of FIG. 25).

In addition, the operations (e.g., the above-described structure of the RF unit and signaling operations related thereto) of the device according to the above-described exemplary embodiment may be stored in the memory (e.g., 104 and 204 of FIG. 25) in the form of instructions/programs (e.g., instruction, executable code) for driving at least one processor (e.g., 102 and 202 of FIG. 25).

[Hereinafter, Method Claim Related Contents]

Hereinafter, the above-described exemplary embodiments will be described in detail with reference to FIG. 22 in terms of the operation of the terminal. Methods described below are only classified for convenience of description, and it goes without saying that some components of one method may be substituted with some components of another method, or may be applied in combination with each other.

FIG. 22 is a flowchart for describing a method for supporting, by a terminal, a plurality of frequency bands in a wireless communication system according to an exemplary embodiment of the present disclosure.

Referring to FIG. 22, a method for supporting, by a terminal, a plurality of frequency bands in a wireless communication system according to an exemplary embodiment of the present disclosure may include a connection-related information receiving step (S2210), a specific CN determining step (S2220), and a specific CN-related request message transmitting (S2230).

In S2210, the terminal receives, from a base station, connection related information which is related to a plurality of connections (CNs) based on different frequency bands and a reference connection (RCN) related to the plurality of CNs.

As an example, the plurality of CNs may be based on connections between the terminal and a plurality of base stations. In this case, the base station may be any one of the plurality of base stations. As another example, the plurality of CNs may be based on a plurality of component carriers (CCs) related to carrier aggregation (CA).

According to an exemplary embodiment, the RCN may be configured for each resource for transmission of the at least one specific downlink signal. As an example, the RCN may be configured for each of a CSI-RS resource and a PTRS resource.

According to an exemplary embodiment, the RCN may be based on a CN related to a specific frequency band among the plurality of CNs. As an example, the RCN may be based on a CN related to the lowest (highest) frequency band among the plurality of CNs.

According to an exemplary embodiment, the RCN may be based on a CN related to a primary cell (PCell) among the plurality of CNs.

The RCN may be based on a combination of the above-described exemplary embodiments. Specifically, the RCN may be based on at least one of i) the CN related to the specific frequency band among the plurality of CNs or ii) the CN related to the primary cell (PCell) among the plurality of CNs.

According to S2210 described above, the operation of the terminal (100/200 of FIGS. 24 to 28) which receives, from the base station (100/200 of FIGS. 24 to 28), connection related information related to a plurality of connections (CNs) based on different frequency bands and a reference connection (RCN) related to the plurality of CNs may be implemented by the devices of FIGS. 24 to 28. For example, referring to FIG. 25, one or more processors 102 may control one or more transceivers 106 and/or one or more memories 104 to receive, from the base station 200, the connection related information related to a plurality of connections (CNs) based on different frequency bands and a reference connection (RCN) related to the plurality of CNs.

In S2220, the terminal may determine at least one specific CN based on a similarity of a radio frequency (RF) characteristic between each CN and the RCN among the plurality of CNs.

According to an exemplary embodiment, the at least one specific CN may be related to a common reference clock. The common reference clock may be related to frequency band transition (or frequency offset correction) of a radio signal performed by the terminal. Specifically, the common reference clock may be a reference clock generated by the oscillator of the RF unit of FIG. 21.

According to an exemplary embodiment, the RF characteristic similarity may be determined based on a predetermined criterion. The predetermined criterion may be related to at least one of frequency offset, frame timing, or phase noise. This exemplary embodiment may be based on the above-described embodiment related to the terminal similarity determination.

The specific CN may be a CN, among the plurality of CNs, whose value, based on a difference between i) a common phase noise (CPN) of the corresponding CN and ii) a value acquired by multiplying the CPN of the RCN by a preconfigured first value, is smaller than a CPN threshold value. The value based on the difference between i) and ii) may be a time average value. The CPN threshold value may be the $th_{CPN}$. The preconfigured first value may be the $\beta_i$.

The specific CN may be a CN, among the plurality of CNs, whose difference value, between i) a frequency offset of the corresponding CN and ii) a value acquired by multiplying the frequency offset of the RCN by a preconfigured second value, is smaller than an offset threshold value. The frequency offset threshold may be the $th_{freq}$. The preconfigured second value may be the $\alpha_i$.

The specific CN may be a CN, among the plurality of CNs, whose value, based on a difference between i) a frame timing of the corresponding CN and ii) a frame timing of the RCN, is smaller than a frame timing threshold value. The frame timing threshold value may be the $th_{FT}$. The value based on the difference between i) and ii) may be a value based on a variance operation.

According to S2220 described above, the operation of the terminal (100/200 of FIGS. 24 to 28) which determines at least one specific CN based on the similarity of the radio frequency (RF) characteristic between each CN and the RCN among the plurality of CNs may be implemented by the devices of FIGS. 24 to 28. For example, referring to FIG. 25, one or more processors 102 may control one or more transceivers 106 and/or one or more memories 104 to determine at least one specific CN based on the similarity of the radio frequency (RF) characteristic between each CN and the RCN among the plurality of CNs.

In S2230, the terminal transmits, to the base station, a request message related to the at least one specific CN.

According to an exemplary embodiment, the request message may be related to off of resource allocation for transmission of at least one specific downlink signal. The at least one specific downlink signal may be related to the at least one specific CN.

The at least one specific downlink signal may include at least one of a phase tracking reference signal (PTRS), a channel state information-reference signal (CSI-RS), or a tracking reference signal (TRS).

According to S2230 described above, the operation of the base station (100/200 of FIGS. 24 to 28) which transmits the request message related to the at least one specific CN to the base station (100/200 of FIGS. 24 to 28) may be implemented by the devices of FIGS. 24 to 28. For example, referring to FIG. 25, one or more processors 102 may control one or more transceivers 106 and/or one or more memories 104 to transmit the request message related to the at least one specific CN to the base station 200.

The method may further include a link quality measuring step and a step of transmitting an RCN update request.

In the link quality measuring step, the terminal measures a link quality of each of the plurality of CNs. As an example, the link quality may be measured based on each channel state information reference signal (CSI-RS) or synchronization signal transmitted through the plurality of CNs.

According to the above-described link quality measuring step, the operation of the terminal (100/200 in FIGS. 24 to 28) which measures the link quality of each of the plurality of CNs may be implemented by the device of FIGS. 24 to 28. For example, referring to FIG. 25, one or more processors 102 may control one or more transceivers 106 and/or one or more memories 104 to measure the link quality of each of the plurality of CNs.

In the RCN update request transmitting step, the terminal transmits an RCN update request to the base station based on the measurement result.

According to an exemplary embodiment, the RCN may be based on any one of the plurality of CNs, and the RCN update request may be transmitted based on the link quality of the RCN being smaller than a specific value. The specific value may be based on a value acquired by subtracting a preconfigured threshold value from a maximum value among values of link qualities related to the plurality of CNs. The specific value may be based on the above-described $\max\{Q_{CNi}\}-Th_Q$.

According to the above-described RCN update request transmitting step, the operation of the terminal (100/200 of FIGS. 24 to 28) which transmits the RCN update request to the base station (100/200 of FIGS. 24 to 28) based on the measurement result may be implemented by the device of FIGS. 24 to 28. For example, referring to FIG. 25, one or more processors 102 may one or more transceivers 106 and/or one or more memories 104 to transmit the RCN update request to the base station 200 based on the measurement result.

According to an exemplary embodiment, the RCN may be updated not only by the RCN update request but also by the base station. Specifically, the base station may update the RCN to another CN among the plurality of CNs according to an uplink situation (link quality) of each CN. When the base station updates the RCN, the base station may transmit update-related information (e.g., RCN after change) to the terminal.

[Hereinafter, Base Station Claim Related Contents]

Hereinafter, the above-described exemplary embodiments will be described in detail with reference to FIG. 23 in terms of the operation of the base station. Methods described below are only classified for convenience of description, and it goes without saying that some components of one method may be substituted with some components of another method, or may be applied in combination with each other.

FIG. 23 is a flowchart for describing a method for supporting, by a base station, a plurality of frequency bands in a wireless communication system according to another exemplary embodiment of the present disclosure.

Referring to FIG. 23, a method for supporting, by a base station, a plurality of frequency bands in a wireless communication system according to another exemplary embodiment of the present disclosure may include a connection-related information transmitting step S2310 and a specific CN related request message receiving step S2320.

In S2310, the base station transmits, to the terminal, connection related information which is related to a plurality of connections (CNs) based on different frequency bands and a reference connection (RCN) related to the plurality of CNs.

As an example, the plurality of CNs may be based on connections between the terminal and a plurality of base stations. In this case, the base station may be any one of the plurality of base stations. As another example, the plurality of CNs may be based on a plurality of component carriers (CCs) related to carrier aggregation (CA).

According to an exemplary embodiment, the RCN may be configured for each resource for transmission of the at least one specific downlink signal. As a specific example, the RCN may be configured for each of a CSI-RS resource and a PTRS resource.

According to an exemplary embodiment, the RCN may be based on a CN related to a specific frequency band among the plurality of CNs. As an example, the RCN may be based on a CN related to the lowest (highest) frequency band among the plurality of CNs.

According to an exemplary embodiment, the RCN may be based on a CN related to a primary cell (PCell) among the plurality of CNs.

The RCN may be based on a combination of the above-described exemplary embodiments. Specifically, the RCN may be based on at least one of i) the CN related to the specific frequency band among the plurality of CNs or ii) the CN related to the primary cell (PCell) among the plurality of CNs.

According to S2310 described above, an operation of the base station (100/200 of FIGS. 24 to 28) which transmits, to the terminal (100/200 of FIGS. 24 to 28), connection related information related to a plurality of connections (CNs) based on different frequency bands and a reference connection (RCN) related to the plurality of CNs may be implemented by the devices of FIGS. 24 to 28. For example, referring to FIG. 25, one or more processors 202 may control one or more transceivers 206 and/or one or more memories 204 to transmit the connection related information related to a plurality of connections (CNs) based on different frequency bands and a reference connection (RCN) related to the plurality of CNs.

In S2320, the base station receives, from the terminal, a request message related to at least one specific CN.

The at least one specific CN may be determined from among the plurality of CNs by the terminal.

At least one specific CN may be determined based on a similarity of a radio frequency (RF) characteristic between each CN and the RCN among the plurality of CNs.

According to an exemplary embodiment, the at least one specific CN may be related to a common reference clock. The common reference clock may be related to frequency band transition (or frequency offset correction) of a radio signal performed by the terminal. Specifically, the common reference clock may be a reference clock generated by the oscillator $CLK_{ref\_org}$ of the RF unit of FIG. 21.

According to an exemplary embodiment, the RF characteristic similarity may be determined based on a predetermined criterion. The predetermined criterion may be related to at least one of frequency offset, frame timing, or phase noise. This exemplary embodiment may be based on the above-described embodiment related to the terminal similarity determination.

The specific CN may be a CN, among the plurality of CNs, whose value, based on a difference between i) a common phase noise (CPN) of the corresponding CN and ii) a value acquired by multiplying the CPN of the RCN by a preconfigured first value, is smaller than a CPN threshold value. The value based on the difference between i) and ii) may be a time average value. The CPN threshold value may be the $th_{CPN}$. The preconfigured first value may be the $\beta_i$.

The specific CN may be a CN, among the plurality of CNs, whose difference value, between i) a frequency offset of the corresponding CN and ii) a value acquired by multiplying the frequency offset of the RCN by a preconfigured second value, is smaller than an offset threshold value. The frequency offset threshold may be the $th_{freq}$. The preconfigured second value may be the $\alpha_i$.

The specific CN may be a CN, among the plurality of CNs, whose value, based on a difference between i) a frame timing of the corresponding CN and ii) a frame timing of the RCN, is smaller than a frame timing threshold value. The frame timing threshold value may be the $th_{FT}$. The value based on the difference between i) and ii) may be a value based on a variance operation.

According to an exemplary embodiment, the request message may be related to off of resource allocation for transmission of at least one specific downlink signal. The at least one specific downlink signal may be related to the at least one specific CN.

The at least one specific downlink signal may include at least one of a phase tracking reference signal (PTRS), a channel state information-reference signal (CSI-RS), or a tracking reference signal (TRS).

According to S2320 described above, the operation of the base station (100/200 of FIGS. 24 to 28) which receives the request message related to the at least one specific CN from the terminal (100/200 of FIGS. 24 to 28) may be implemented by the devices of FIGS. 24 to 28. For example, referring to FIG. 25, one or more processors 202 may control one or more transceivers 206 and/or one or more memories 204 to receive the request message related to the at least one specific CN to the terminal 100.

The method may further include a step of receiving an RCN update request.

In the RCN update request receiving step, the base station receives the RCN update request based on a link quality measurement result of each of the plurality of CNs from the terminal. The link quality may be measured by the terminal based on each channel state information reference signal (CSI-RS) or synchronization signal transmitted through the plurality of CNs.

According to an exemplary embodiment, the RCN may be based on any one of the plurality of CNs, and the RCN update request may be transmitted based on the link quality of the RCN being smaller than a specific value. The specific value may be based on a value acquired by subtracting a preconfigured threshold value from a maximum value among values of link qualities related to the plurality of CNs. The specific value may be based on the above-described $\max\{Q_{CNi}\}-Th_Q$.

According to the RCN update request receiving step, the operation of the base station (100/200 of FIGS. 24 to 28) which the RCN update request based on the link quality measurement result of each of the plurality of CNs from the terminal (100/200 of FIGS. 24 to 28) may be implemented by the devices of FIGS. 24 to 28. For example, referring to FIG. 25, one or more processors 202 may control one or more transceivers 206 and/or one or more memories 204 to receive, from the terminal 100, the RCN update request based on the link quality measurement result of each of the plurality of CNs.

According to an exemplary embodiment, the RCN may be updated not only by the RCN update request but also by the base station. Specifically, the base station may update the RCN to another CN among the plurality of CNs according to an uplink situation (link quality) of each CN. When the base station updates the RCN, the base station may transmit update-related information (e.g., RCN after change) to the terminal.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 6G) between devices.

Hereinafter, a description will be certain in more detail with reference to the drawings. In the following drawings/description, the same reference symbols may denote the same or corresponding hardware blocks, software blocks, or functional blocks unless described otherwise.

FIG. 24 illustrates a communication system 1 applied to the present disclosure.

Referring to FIG. 24, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices Applied to Present Disclosure

FIG. 25 illustrates wireless devices applicable to the present disclosure.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of a Signal Process Circuit for a Transmission Signal Applied to Present Disclosure FIG. 26 illustrates a signal process circuit for a transmission signal applied to the present disclosure.

Referring to FIG. 26, a signal processing circuit 1000 may include scramblers 1010, modulators 1020, a layer mapper 1030, a precoder 1040, resource mappers 1050, and signal generators 1060. An operation/function of FIG. 26 may be performed, without being limited to, the processors 102 and 202 and/or the transceivers 106 and 206 of FIG. 25. Hardware elements of FIG. 26 may be implemented by the processors 102 and 202 and/or the transceivers 106 and 206 of FIG. 25. For example, blocks 1010 to 1060 may be implemented by the processors 102 and 202 of FIG. 25. Alternatively, the blocks 1010 to 1050 may be implemented by the processors 102 and 202 of FIG. 25 and the block 1060 may be implemented by the transceivers 106 and 206 of FIG. 25.

Codewords may be converted into radio signals via the signal processing circuit 1000 of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 26. For example, the wireless devices (e.g., 100 and 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of a Wireless Device Applied to Present Disclosure

FIG. 27 illustrates another example of a wireless device applied to the present disclosure. The wireless device may be implemented in various forms according to a use-case/service (refer to FIG. 24).

Referring to FIG. 27, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s) 114 may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 24), the vehicles (100*b*-1 and 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of a Hand-Held Device Applied to Present Disclosure

FIG. 28 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Effects of the method and the device for supporting a plurality of frequency bands in the wireless communication system according to the exemplary embodiment of the present disclosure are described as follows.

According to an exemplary embodiment of the present disclosure, at least one specific CN among a plurality of CNs based on different frequency bands is determined. The at least one specific CN is determined based on RF characteristic similarity with a reference connection (RCN). The at least one specific CN is related to a common reference clock. Accordingly, in transmission and reception of radio signals through a plurality of frequency bands (related to the at least one specific CN), compensation according to RF characteristics (compensation related to phase noise, frequency offset, timing offset, etc.) can be effectively performed based on one reference clock (i.e., the common reference clock). That is, as operations and computations related to the compensation according to the RF characteristics are prevented from being redundantly performed, operation of the terminal can be simplified and power consumption of the terminal can be reduced.

Compensation related to the RF characteristics of the radio signals transmitted and received through the at least one specific CN can be performed based on measurement of signals (e.g., PTRS, CSI-RS, and TRS) received through the RCN. According to an exemplary embodiment of the present disclosure, a request message related to the at least one specific CN is transmitted, and the request message is related to off resource allocation for transmission of at least one specific downlink signal. Accordingly, it is possible to improve resource utilization in performing communication through a plurality of frequency bands by turning off unnecessary resource allocation.

Here, wireless communication technology implemented in wireless devices (e.g., 100/200 of FIG. 25) of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices (e.g, 100/200 of FIG. 25) of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices (e.g, 100/200 of FIG. 25) of the present disclosure may include at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an exemplary embodiment of the present disclosure. The sequence of the operations described in the embodiments of the present disclosure may be changed. Some of the elements or characteristics of an exemplary embodiment may be included in another embodiment or may be replaced with corresponding elements or characteristics of another embodiment. It is evident that an exemplary embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A method comprising:

receiving, by a user equipment (UE) from a base station, a downlink signal which is related to a cell search performed by the UE to acquire synchronization and detect a cell ID, wherein the downlink signal includes a Primary Synchronization Signal (PSS), a Secondary Synchronization Signal (SSS) and a Physical Broadcast Channel (PBCH);

receiving, by the UE from the base station, system information;

transmitting, by the UE to the base station, a random access preamble based on a physical random access channel (PRACH);

receiving, by the UE from the base station, a random access response (RAR) message based on a physical downlink control channel (PDCCH) and a physical downlink shared channel (PDSCH);

based on a random access procedure based on the random access preamble being a contention-based random access procedure, receiving, by the UE from the base station, a contention resolution message;

receiving, by the UE from the base station, configuration information which is related to a connection between the UE and the base station;

determining, by the UE, information related to a message, based on the configuration information; and transmitting, by the UE to the base station, the message, wherein the connection is related to a plurality of connections (CNs) based on different frequency bands and a reference connection (RCN) related to the plurality of CNs, wherein the information related to the message includes at least one specific CN among the plurality of CNs which is determined based on a similarity of a Radio Frequency (RF) characteristic between the RCN and each CN, and the similarity of the RF characteristic is determined based on a predetermined reference related to at least one of a frequency offset, a frame timing or a phase noise, wherein the at least one specific CN is related to a common reference clock, wherein the common reference clock is related to a frequency band transition of a radio signal performed by the UE, wherein the message is related to a request to disable a resource allocation for transmission of at least one specific downlink signal related to the at least one specific CN, wherein the specific CN is a CN, among the plurality of CNs, whose value, based on a difference between i) a common phase noise (CPN) of the corresponding CN and ii) a value acquired by multiplying the CPN of the RCN by a preconfigured first value, is smaller than a CPN threshold value.

2. The method of claim 1, wherein the at least one specific downlink signal includes at least one of a phase tracking reference signal (PTRS), a channel state information-reference signal (CSI-RS), or a tracking reference signal (TRS).

3. The method of claim 1, wherein the RCN is configured for each resource for transmission of the at least one specific downlink signal.

4. The method of claim 1, wherein the RCN is based on at least one of i) a CN related to a specific frequency band among the plurality of CNs or ii) a CN related to a primary cell (PCell) among the plurality of CNs.

5. The method of claim 1, further comprising:
measuring a link quality of each of the plurality of CNs; and
transmitting an RCN update request based on the measurement result.

6. The method of claim 5, wherein the RCN is based on any one of the plurality of CNs, and
the RCN update request is transmitted based on the link quality of the RCN being smaller than a specific value.

7. The method of claim 1, wherein the specific CN is a CN, among the plurality of CNs, whose difference value, between i) a frequency offset of the corresponding CN and ii) a value acquired by multiplying the frequency offset of the RCN by a preconfigured second value, is smaller than an offset threshold value.

8. The method of claim 7, wherein the specific CN is a CN, among the plurality of CNs, whose value, based on a difference between i) a frame timing of the corresponding CN and ii) a frame timing of the RCN, is smaller than a frame timing threshold value.

9. A user equipment (UE) comprising:
one or more transceivers;
one or more processors controlling the one or more transceivers; and
one or more memories connected to the one or more processors, and storing instructions for performing operations based on being executed by the one or more processors,
wherein the operations include
receiving, from a base station, a downlink signal which is related to a cell search performed by the UE to acquire synchronization and detect a cell ID,
wherein the downlink signal includes a Primary Synchronization Signal (PSS), a Secondary Synchronization Signal (SSS) and a Physical Broadcast Channel (PBCH);
receiving, from the base station, system information;
transmitting, to the base station, a random access preamble based on a physical random access channel (PRACH);
receiving, from the base station, a random access response (RAR) message based on a physical downlink control channel (PDCCH) and a physical downlink shared channel (PDSCH);
based on a random access procedure based on the random access preamble being a contention-based random access procedure, receiving, from the base station, a contention resolution message;
receiving, from the base station, configuration information which is related to a connection between the UE and the base station;
determining information related to a message, based on the configuration information; and
transmitting, to the base station, the message,
wherein the connection is related to a plurality of connections (CNs) based on different frequency bands and a reference connection (RCN) related to the plurality of CNs,
wherein the information related to the message includes at least one specific CN among the plurality of CNs which is determined based on a similarity of a Radio Frequency (RF) characteristic between the RCN and each CN, and the similarity of the RF characteristic is determined based on a predetermined reference related to at least one of a frequency offset, a frame timing or a phase noise,
wherein the at least one specific CN is related to a common reference clock,
wherein the common reference clock is related to a frequency band transition of a radio signal performed by the UE,
wherein the message is related to a request to disable a resource allocation for transmission of at least one specific downlink signal related to the at least one specific CN,
wherein the specific CN is a CN, among the plurality of CNs, whose value, based on a difference between i) a common phase noise (CPN) of the corresponding CN and ii) a value acquired by multiplying the CPN of the RCN by a preconfigured first value, is smaller than a CPN threshold value.

10. A base station comprising:
one or more transceivers;
one or more processors controlling the one or more transceivers; and
one or more memories connected to the one or more processors, and storing instructions for performing operations when based on being executed by the one or more processors,
wherein the operations include:
transmitting, to a user equipment (UE), a downlink signal which is related to a cell search for the UE to acquire synchronization and detect a cell ID,
wherein the downlink signal includes a Primary Synchronization Signal (PSS), a Secondary Synchronization Signal (SSS) and a Physical Broadcast Channel (PBCH);
transmitting, to the UE, system information;
receiving, from the UE, a random access preamble based on a physical random access channel (PRACH);
transmitting, to the UE, a random access response (RAR) message based on a physical downlink control channel (PDCCH) and a physical downlink shared channel (PDSCH);
based on a random access procedure based on the random access preamble being a contention-based random access procedure, transmitting, to the UE, a contention resolution message;
transmitting, to the UE, configuration information which is related to a connection between the UE and the base station, wherein information related to a message is determined, by the UE, based on the configuration information; and
receiving, from the UE, the message,
wherein the connection is related to a plurality of connections (CNs) based on different frequency bands and a reference connection (RCN) related to the plurality of CNs,
wherein the information related to the message includes at least one specific CN among the plurality of CNs which is determined based on a similarity of a Radio Frequency (RF) characteristic between the RCN and each CN, and the similarity of the RF characteristic is determined based on a predetermined reference related to at least one of a frequency offset, a frame timing or a phase noise,
wherein the at least one specific CN is related to a common reference clock,
wherein the common reference clock is related to a frequency band transition of a radio signal performed by the UE, and wherein the message is related to a request to disable a resource allocation for transmission of at least one specific downlink signal related to the at least one specific CN, wherein the specific CN is a CN, among the plurality of CNs, whose value, based on a difference between i) a common phase noise (CPN) of the corresponding CN and ii) a value acquired by multiplying the CPN of the RCN by a preconfigured first value, is smaller than a CPN threshold value.

* * * * *